United States Patent [19]

Mitani

[11] Patent Number: 6,052,200
[45] Date of Patent: Apr. 18, 2000

[54] MEMORY MANAGEMENT METHOD, PRINTING CONTROL DEVICE AND PRINTING APPARATUS

[75] Inventor: Keisuke Mitani, Yokohama, Japan

[73] Assignee: Canon Kabushiki Kaisha, Tokyo, Japan

[21] Appl. No.: 08/972,433

[22] Filed: Nov. 18, 1997

[30] Foreign Application Priority Data

Nov. 18, 1996 [JP] Japan ..................................... 8-306564

[51] Int. Cl.$^7$ .................................................. G06K 15/00
[52] U.S. Cl. .......................................... 358/1.16; 358/1.17
[58] Field of Search .................................... 395/101, 113, 395/114, 115, 116, 102, 109; 358/296, 430, 404, 444, 426, 429, 261.2, 261.4

[56] References Cited

U.S. PATENT DOCUMENTS 5,347,368  9/1994  Mochizuki ............................... 358/296
5,471,563  11/1995  Dennis et al. ........................... 395/114

*Primary Examiner*—Arthur G. Evans
*Attorney, Agent, or Firm*—Fitzpatrick, Cella, Harper & Scinto

[57] ABSTRACT

A memory management method for use in a printing process in which a time required for rendering is calculated, for managing printing data in units of band, calculating a size of the printing data in a memory, managing plural band rasters, varying the number of band rasters to be managed in the memory, converting an image to data for management, determining in accordance with a memory state whether or not data conversion is performed, and calculating a data size in the memory after the data conversion.

20 Claims, 28 Drawing Sheets

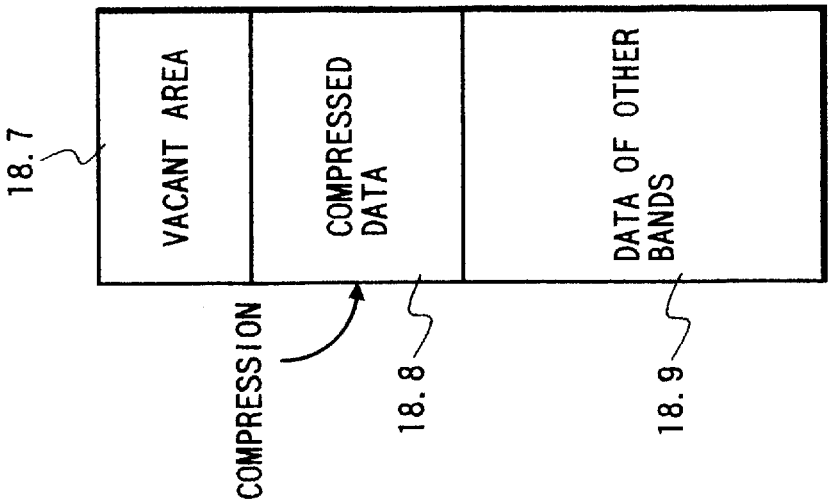
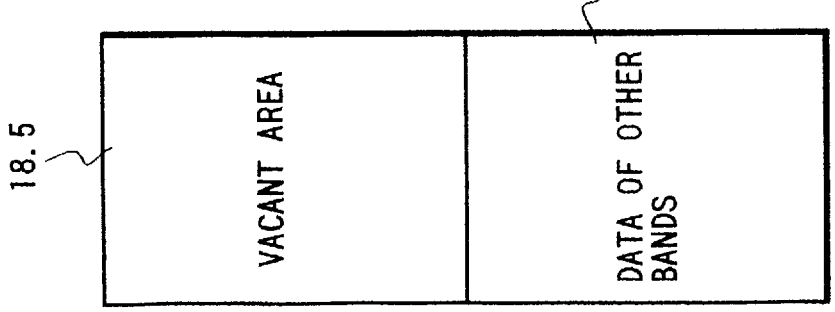
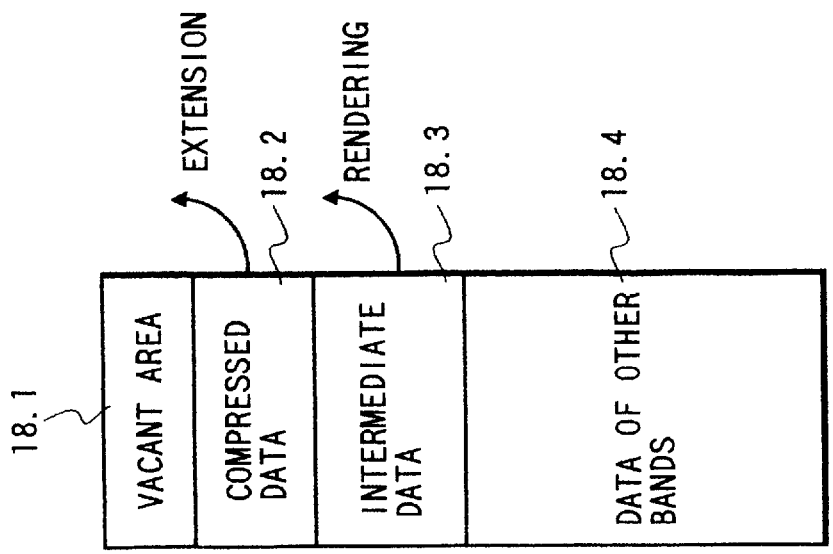

MEMORY MANAGEMENT METHOD, PRINTING CONTROL DEVICE AND PRINTING APPARATUS

BACKGROUND OF THE INVENTION

1. Field of the Invention

The present invention relates to a laser beam printer or another printing apparatus which prepares bit map data from intermediate data before printing, and a printing control device and a memory management method which are used in the printing apparatus.

2. Related Background Art

There are widely used printing apparatus which receive data (printing data) representing contents to be printed and a printing format from a host computer or the like, prepare from the received data a bit map to be actually outputted (hereinafter, referred to as rendering) and print/output the bit map on, for example, a sheet of paper (hereinafter, referred to as shipping).

In the printing apparatus of the type rendering and thereafter shipping an output bit map of one page, a memory for holding the output bit map of one page is essential. This results in a disadvantage that the memory capacity must be increased, particularly, in a printing apparatus with a high degree of output resolution or the like; hence the apparatus are very expensive.

There are also printing apparatuses of the (banding process) type that one page is divided into a plurality of smaller units (bands), and a bit map of one band is rendered and thereafter shipped. In the apparatuses, a rendering process for the next band is performed in parallel with a shipping process for the previous band. Such printing apparatuses have a disadvantage that if the rendering time of the next band is longer than the shipping time for the previous band in the parallel process, a print overrun phenomenon occurs.

Another disadvantage is that because a memory for holding the printing data of one page is required in addition to the memory for holding the rendered bit map, the printing data of one page cannot be processed (hereinafter referred to as the memory deadlock) if the memory capacity is deficient.

SUMMARY OF THE INVENTION

Therefore, an object of the invention is to provide a printing apparatus in which by holding down a memory capacity to some degree and preventing print overrun and memory deadlock from occurring, a guarantee that all pages are surely printed is inexpensively realized.

To attain this and other objects, the invention provides a memory management method for use in a printing process for calculating a time required for rendering. The memory management method comprises a memory management step of managing printing data in units of band, a step of calculating a size of the printing data in a memory, a memory management step of managing plural band rasters, a memory management step of varying the number of band rasters to be managed in the memory, a memory management step of converting an image to data for management, a step of determining in accordance with a memory state whether or not data conversion is performed, and a step of calculating a data size in the memory after the data conversion.

The invention also provides a printing apparatus which comprises a means for managing printing data in units of band, a means for calculating a size of the printing data in a memory, a means for managing plural band rasters, a means for varying the number of band rasters to be managed in the memory, a means for converting an image to data for management, a means for determining in accordance with a memory state whether or not data conversion is to be performed and a means for calculating a data size in the memory after the data conversion.

Further, the invention provides a printing control device which comprises a means for converting bit map data of every band, a means for estimating a data size after the data conversion and a determination means for determining based on the estimation of the estimating means whether or not the bit map data of every band is to be converted by the conversion means.

Also, the invention provides a printing data process method which comprises the steps of obtaining a bit map data of every band, estimating a data size of the obtained bit map data after the data conversion and determining based on the estimation made at the estimating step whether or not the bit map data of every band is to be converted.

Preferably, the number of band rasters is variable so as to change a rendering timing.

Preferably, the data conversion is performed by compression.

Preferably, the data conversion is performed by lowering a resolution.

Preferably, the data conversion is performed by lowering a gradation.

Preferably, it is determined whether or not data conversion is performed in units of band.

Preferably, plural data conversions are selected in accordance with the memory state.

Preferably, the data size after the data conversion is calculated by estimating a size of the compressed data in the memory based on a compression method.

Other objects and effects of the present invention will be more apparent from referring to the accompanying drawings, the following detailed description and the claims.

BRIEF DESCRIPTION OF THE DRAWINGS

FIGS. 18A, 18B and 18C are diagrams for showing a manner of determining whether or not a memory is deficient in the first embodiment of the invention.

DETAILED DESCRIPTION OF THE PREFERRED EMBODIMENTS

Preferred embodiments of the present invention are now described with reference to the accompanying drawings.

FIRST EMBODIMENT

1. Description of FIG. 1 (Description of Apparatus)

First, a constitution of a preferable laser beam printer (page printer) to which the first embodiment is applied is described with reference to FIG. 1.

It is needless to say that printing apparatus to which the invention is applicable are not limited to laser beam printers, but may be ink jet printers and the like employing other printing methods.

Figure 1:
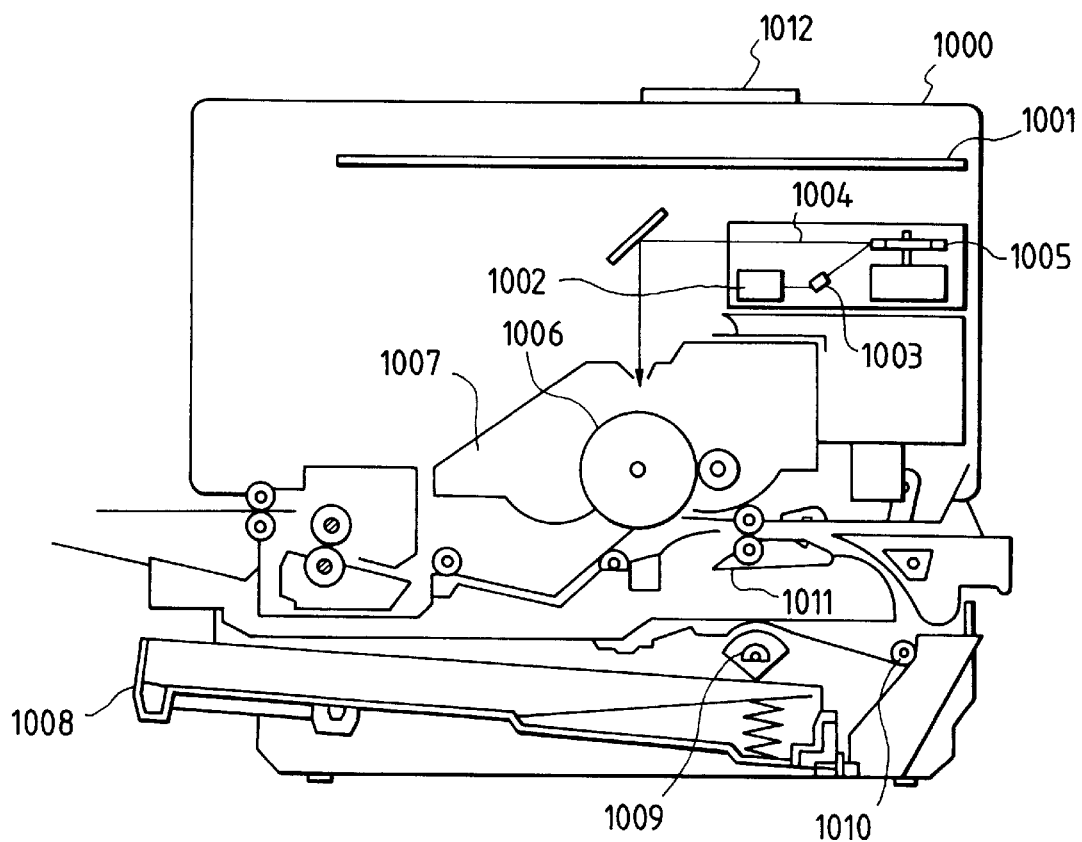
FIG. 1 is a sectional view showing a constitution of an output apparatus to which the present invention can be applied.

FIG. 1 is a sectional view showing a constitution of a first output apparatus to which the invention is applicable, e.g., a laser beam printer (LBP).

In FIG. 1, numeral 1000 is an LBP body which receives and stores printing data (a printer language like a page description language constituted of character codes, control codes and the like), form information, macro commands and the like that are supplied from a host computer connected to the exterior, and prepares bit map data for corresponding character patterns, form patterns and the like in accordance with the received information to form an image on a recording paper or another recording medium. Numeral 1012 is a control panel on which operating switches, LED indicators and the like are disposed, and 1001 is a printer control unit for controlling the entire LBM body 1000 and analyzing the printing data and the like supplied from the host computer.

The printer control unit 1001 primarily converts the character information (character codes) into video signals representing the corresponding character pattern and outputs the video signal to a laser driver 1002.

The laser driver 1002 is a circuit for driving a semiconductor laser 1003 and switching on/off a laser beam 1004, emitted from the semiconductor laser 1003, in accordance with the video signals input thereto.

The laser beam 1004 is deflected to the left and right by a rotating polygonal mirror 1005 to scan over an electrostatic drum 1006 for exposure.

An electrostatic latent image of the character pattern is thereby formed on the electrostatic drum 1006. The latent image is developed by a development unit 1007 disposed around the electrostatic drum 1006, and then transferred onto the recording paper. The electrostatic drum 1006 is rotated at a constant speed.

The recording paper is in the form of cut sheets which are stocked in a sheet cassette 1008 mounted in the LBP body 1000, and are taken into the body and supplied to the electrostatic drum 1006 through a sheet supply roller 1009 and feed rollers 1010 and 1011.

Further, the LBP body 1000 includes a card slot (not shown) for connection with an option font card including fonts other than built-in fonts and a control card (emulation card) including fonts of a different printer language.

2. Description of FIG. 2 (Structural Block Diagram)

Figure 2:
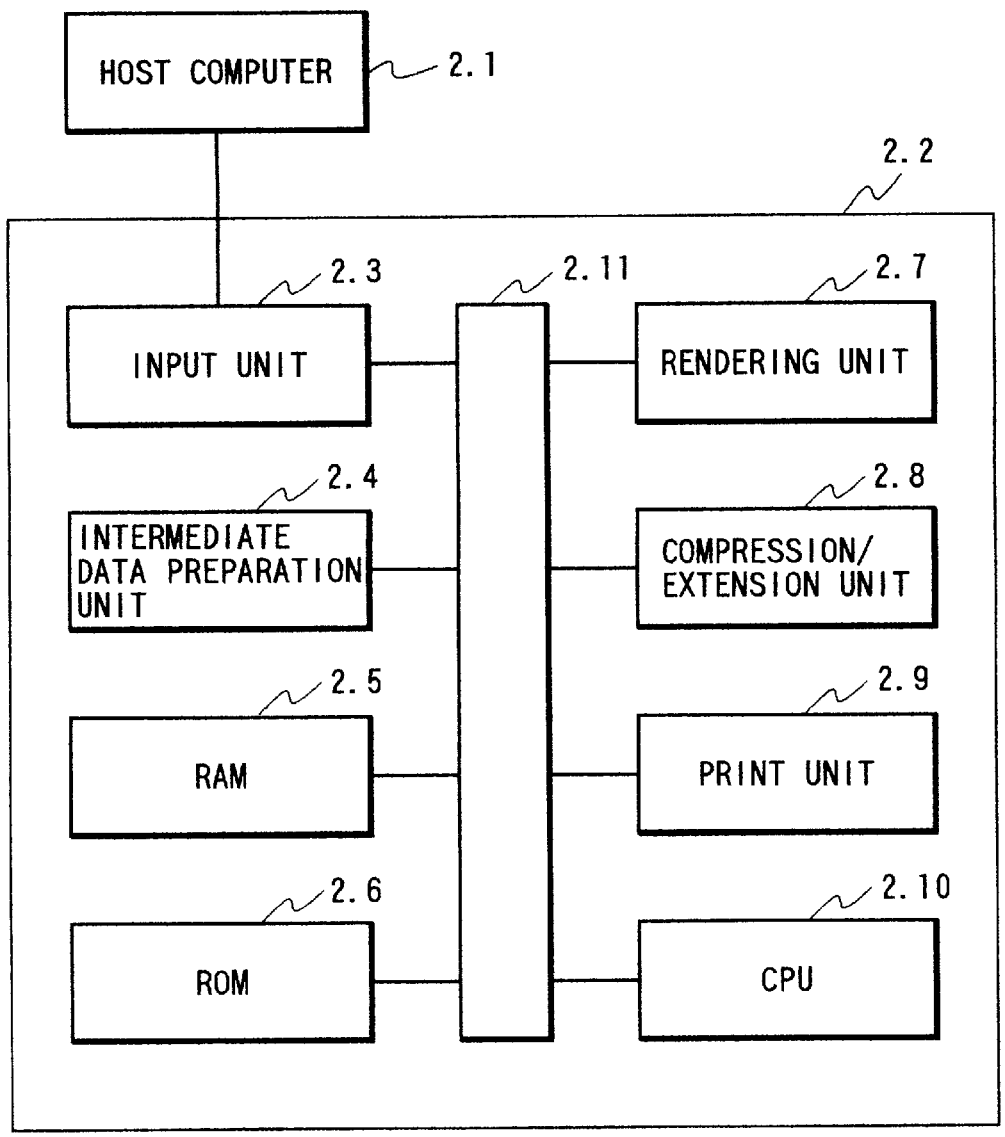
FIG. 2 is a block diagram for showing a constitution of a printer control system in an embodiment of the invention.

FIG. 2 is a block diagram showing a constitution of a printer control system of the laser beam printer (FIG. 1).

It is a matter of course that the invention is applicable to any of a single apparatus, a system constituted of plural apparatus, and a system in which data is processed through LAN or another network, so long as it can execute the function of the invention.

In FIG. 2, a host computer 2.1 is connected to a printing apparatus 2.2 (corresponding to the LBP body 1000 in FIG. 1) through a predetermined interface (e.g., a bi-directional interface) to execute a communication process.

The printing apparatus 2.2 is used to explain the first embodiment of the invention.

An input unit 2.3 executes a communication process with the host computer 2.1. The input unit 2.3 receives printing data from the host computer 2.1. If necessary, the input unit 2.3 may also transmit information of the printing apparatus 2.2 to the host computer 2.1.

An intermediate data preparation unit 2.4 converts the printing data into intermediate data having a form which can be easily handled in the printing apparatus.

Numeral 2.5 denotes a RAM as one example of a memory used in the first embodiment. The RAM holds the intermediate data derived from the printing data received by the input unit 2.3, a bit map resulting from rendering of the intermediate data, a temporary buffer area necessary for processing and various process states.

Numeral 2.6 denotes a ROM for holding programs required for processes as described later and other processes executed in the printing apparatus 2.2.

A rendering unit 2.7 prepares, based on the intermediate data stored in the RAM 2.5, a printing image (bit map image) which is actually outputted for printing.

A compression/extension unit 2.8 compresses the bit map image and extends the compressed bit map image.

A print unit 2.9 prints and outputs the printing image prepared by the rendering unit 2.7 and an image extended by the compression/extension unit 2.8 onto, for example, a sheet of actual paper.

A CPU 2.10 actually executes a printing process and data processing as described later in the printing apparatus 2.2 according to the first embodiment of the invention.

Numeral 2.11 denotes an internal bus for interconnecting the respective units of the printing apparatus.

Figure 14:
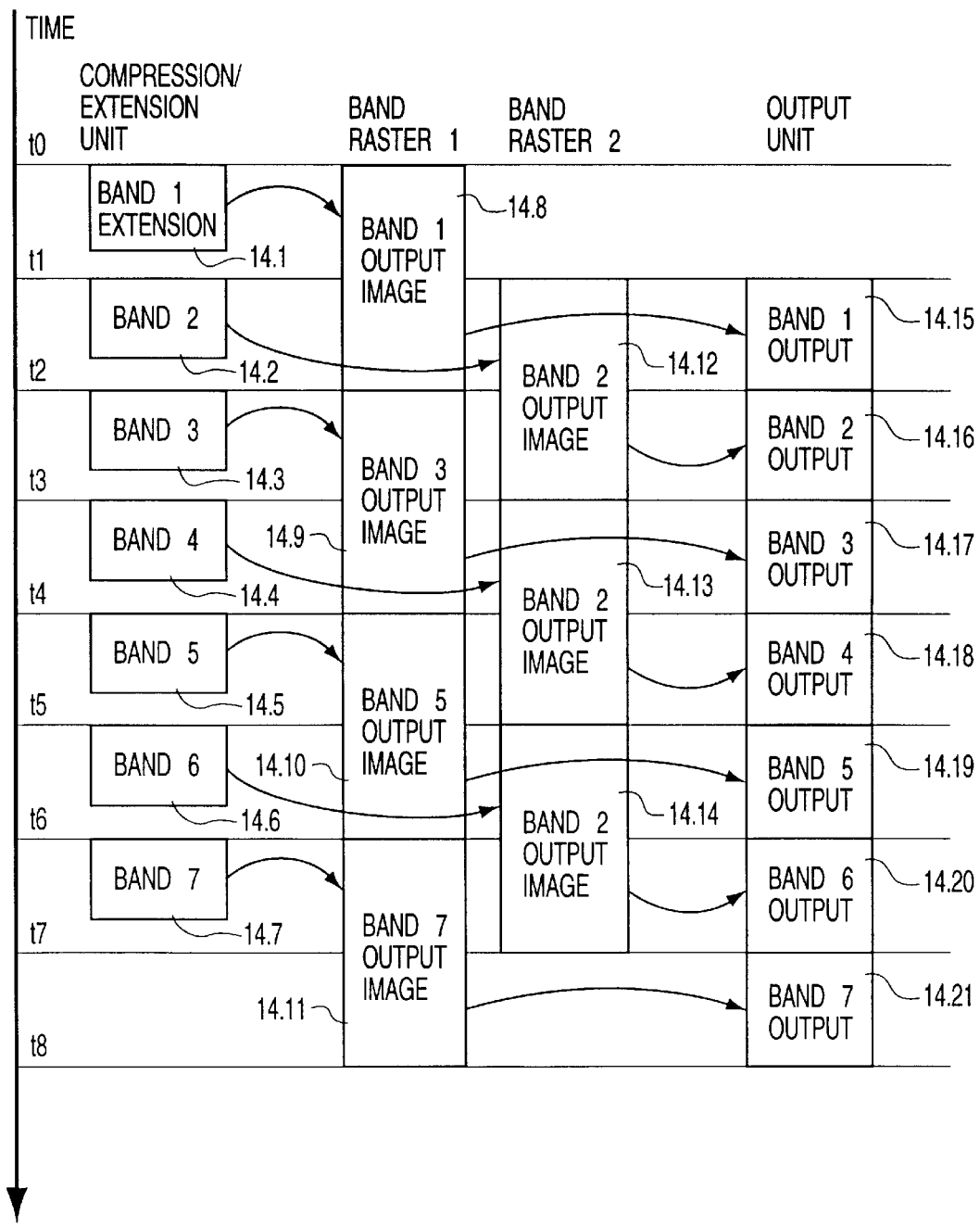
FIG. 14 is a time chart for showing a time relationship in a printing output process when the page compression is performed in the embodiment of the invention.
Figure 15:
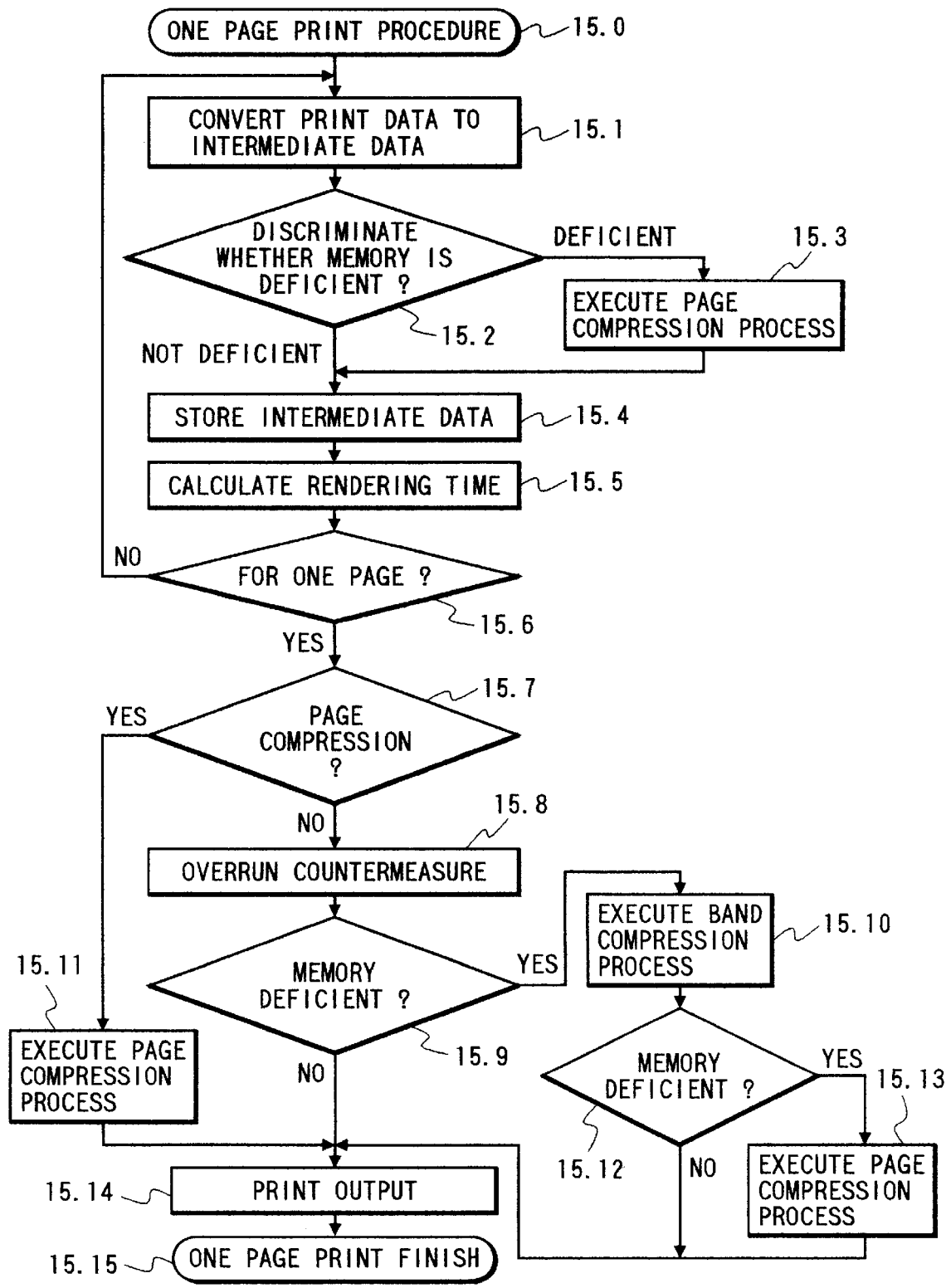
FIG. 15 is a flowchart of a procedure for printing one page in the first embodiment of the invention.

For processes executed by the CPU 2.10 in accordance with the programs stored in the ROM 2.6, a data processing method in the printing apparatus 2.2 is first described using FIGS. 3, 4, 5, 6, 7, 8A, 8B, 9, 10A, 10B, 11, 12A, 12B, 13 and 14 and further detailed using the flowchart of FIG. 15 and subsequent figures.

3. Description of FIG. 3 (State Transition Diagram)

Figure 3:
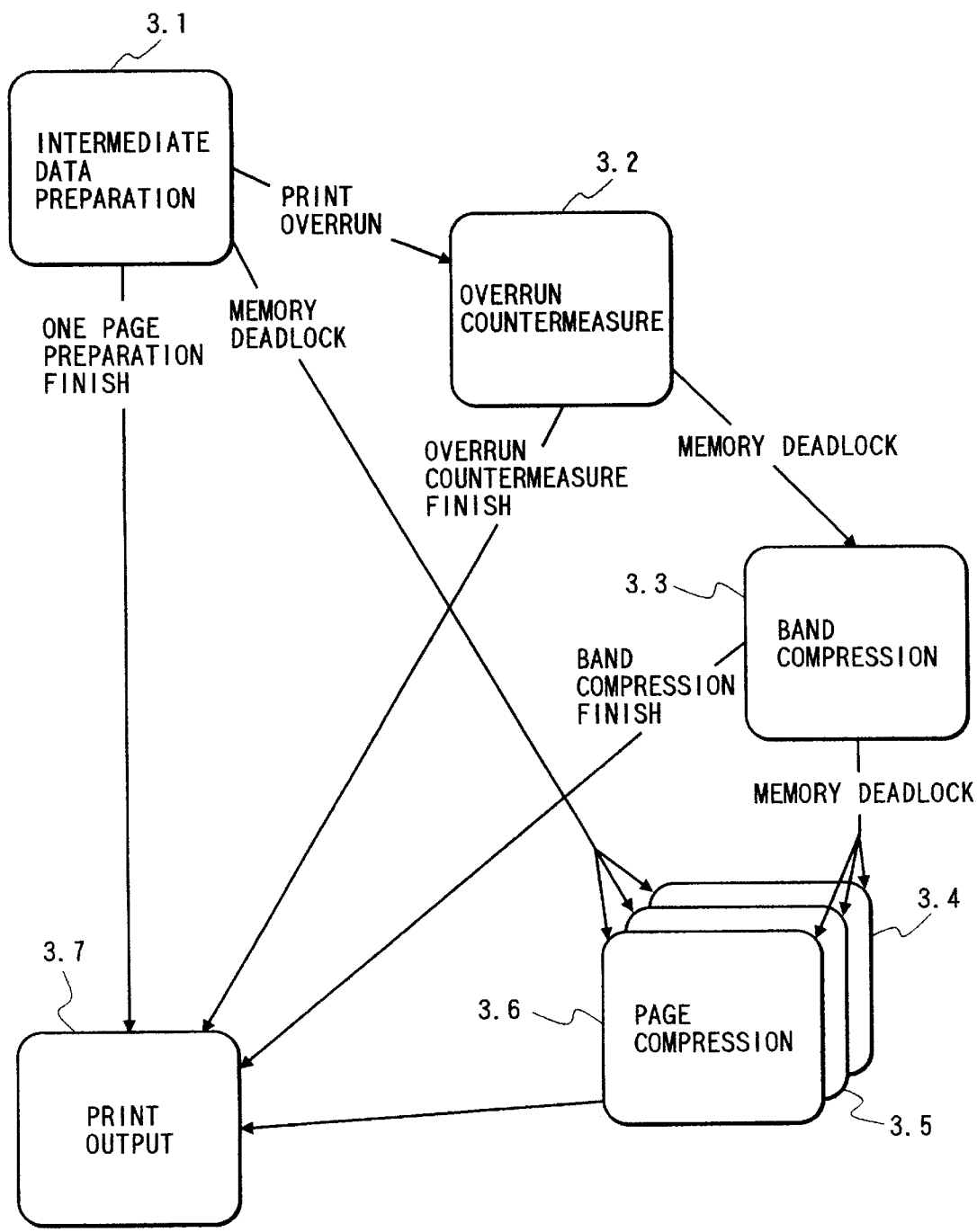
FIG. 3 is a state transition diagram for showing state transition of internal processing of the printer control system in the first embodiment of the invention.

FIG. 3 is a state transition diagram showing a transition of processing in the printing apparatus 2.2 according to the first embodiment of the invention.

In the first embodiment, there is a transition among chiefly five states, so that all the printing data can be outputted by completely avoiding print overrun and memory deadlock.

A state 3.1 represents a processing state where the printing data received by the input unit 2.3 from the host computer 2.1 is stored in the RAM 2.5 in a format of intermediate data. After receiving the printing data of one page, the internal processing transits to a state 3.7 where printing output is actually performed on a sheet in accordance with the intermediate data. The process in the state 3.1 is described with reference to FIGS. 4 to 7, and the printing output process in the state 3.7 is described with reference to FIG. 24.

If in the state 3.1 the RAM for storing the intermediate data is deficient in memory (memory deadlock), the internal processing transits to states 3.4 to 3.6. In the states 3.4 to 3.6, the entire page is compressed to secure a vacant memory area to avoid the deadlock. These states are different in compression manner. In the state 3.1 it is determined by considering respective features of the manners which manner is to be used. Such determination is detailed later with reference to FIGS. 18A to 18C.

On the other hand, in the state 3.1 after the intermediate data of one page is stored, a possibility of print overrun is checked. If there is a fear of overrun, the internal processing transits to a state 3.2 for taking an overrun countermeasure. After finishing the overrun countermeasure, the printing output is executed in the state 3.7. The checking of the overrun and the processing in the state 3.2 are described later with reference to FIGS. 8A and 8B and the subsequent figures.

In the state 3.2, memory deadlock may occur through the overrun countermeasure. In this case, the internal processing transits to a state 3.3 for performing a band compression process to avoid the deadlock. After completing the band compression process, the printing output is executed in the state 3.7. If the deadlock cannot be avoided, the processing transits to the page compression process in the state 3.4 and the subsequent states. Operation of the band compression process is described later with reference to FIGS. 10A and 10B and the subsequent figures.

4. Description of FIG. 4 (Data Input Memory Diagram)

Figure 4:
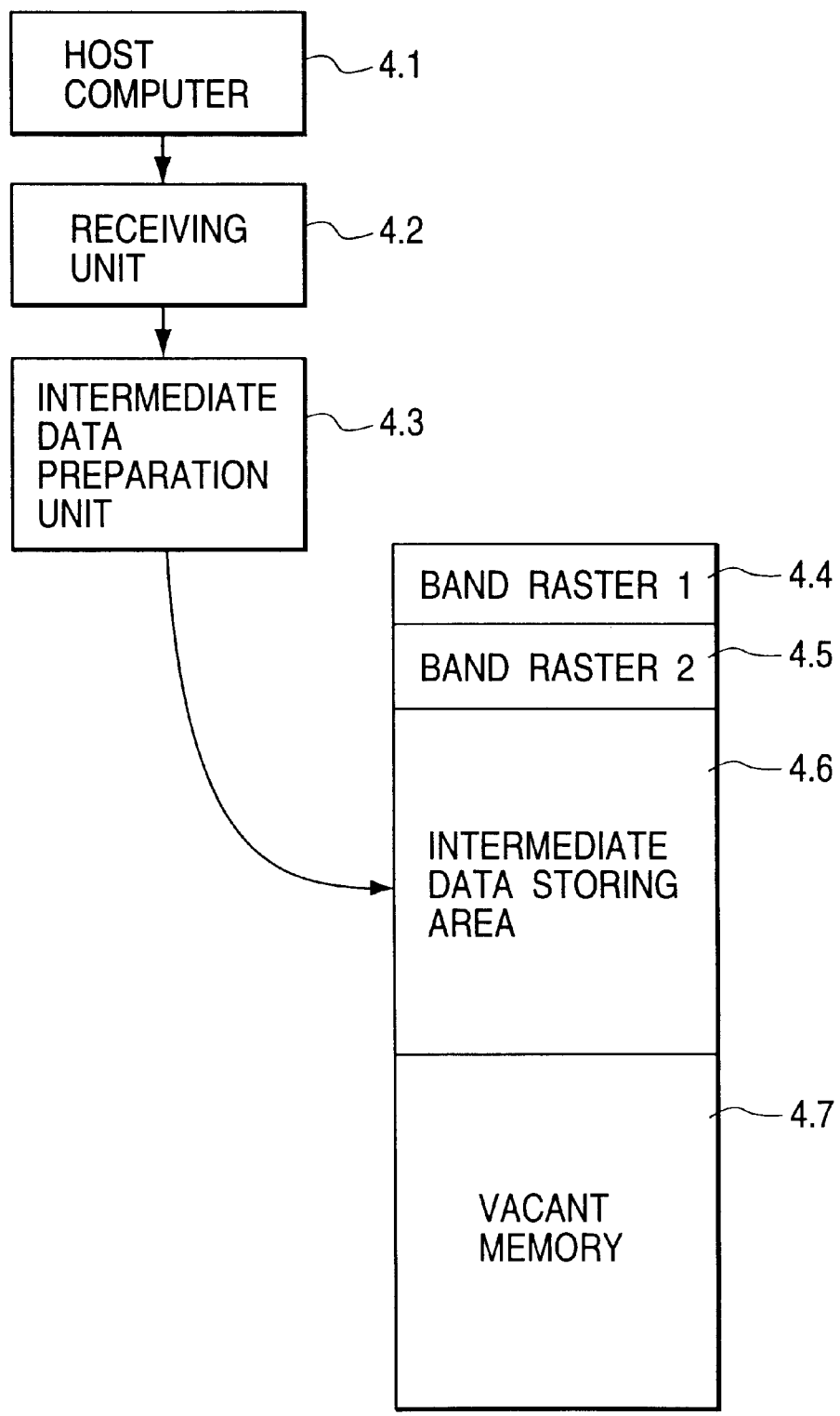
FIG. 4 is an explanatory view of a memory process of receiving printing data in the first embodiment of the invention.

FIG. 4 is a diagram for describing a printing data receiving process of the printing apparatus 2.2 in the embodiment of the invention.

In FIG. 4, numerals 4.4 to 4.7 denote the RAM 2.5 of the printing apparatus 2.2.

When printing data is transferred from a host computer 4.1 to a receiving unit 4.2, the data is converted in an intermediate data preparation unit 4.3 into intermediate data which is stored in an intermediate data storing area 4.6 in the RAM 2.5. A structure of the intermediate data is detailed later with reference to FIG. 5.

In the RAM 2.5, in addition to the intermediate data storing area 4.6, there are also prepared two areas called a first band raster 4.4 and a second band raster 4.5. These areas store an output image to be printed and outputted, which is obtained by rendering the intermediate data in the normal printing process. The areas are described later with reference to FIG. 6.

A remaining area of the RAM is formed of a vacant memory 4.7. When no printing data is stored, no intermediate data exists in the intermediate data storing area 4.6. In the RAM of this state, only the vacant memory 4.7 exists except the first and second band rasters 4.4 and 4.5.

Even after the intermediate data of one page is stored in the intermediate data storing area 4.6, the vacant memory 4.7 still exists. In this case, in parallel with the printing output process of the stored page, the intermediate data of the next page is continuously stored. Thereby, the printing data can be received continuously until a memory capacity becomes full.

A structure of management of the intermediate data in the intermediate data storing area 4.6 is now described.

5. Description of FIG. 5 (Intermediate Data Structure)

Figure 5:
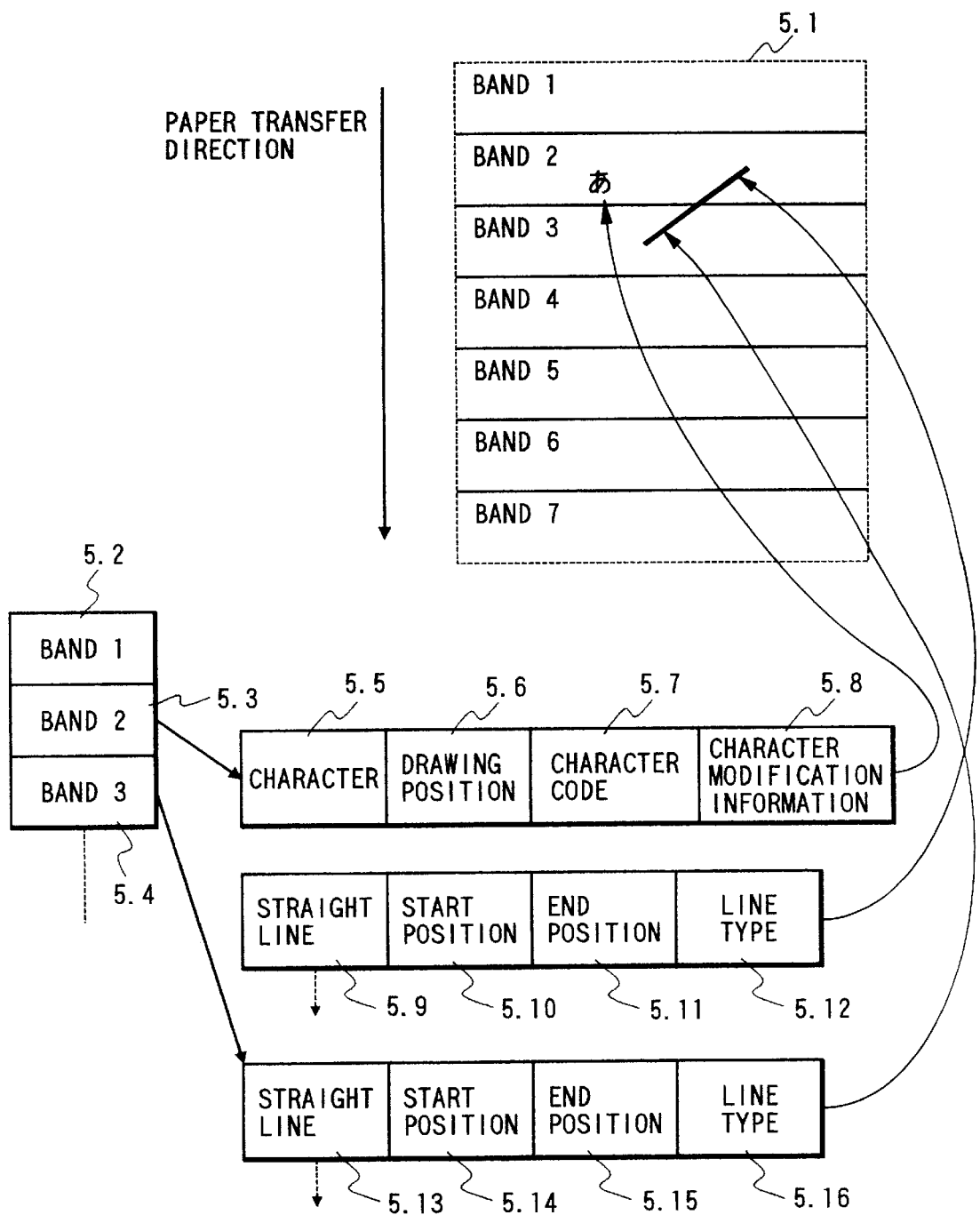
FIG. 5 is an explanatory view of a structure and management format of intermediate data in the embodiment of the invention.

FIG. 5 is a diagram for describing the structure and management format of the intermediate data in the printing apparatus of the first embodiment.

In the printing apparatus according to the first embodiment of the invention, one output page is divided into several small areas (bands), and rendering and printing output of the respective bands are performed simultaneously in a parallel process. To manage the printing data in units of band for the purpose, the embodiment manages the printing data in a form of intermediate data which is easy to manage. The parallel process is described later using FIG. 6 and the like.

First, numeral 5.1 denotes an output sheet of one page which is divided into several bands shown as band 1, band 2 and the like. As shown in the figure, the bands are arranged vertically to a sheet feeding direction. Also, since the bands are divided so as to have the same area, time required for forming an electrostatic latent image of one band at the time of output of the sheet is constant.

Assuming now that the printing apparatus receives the printing data for drawing one character "カ" and an oblique straight line as shown in the output sheet 5.1, the intermediate data has the structure below.

The intermediate data is first linked to intermediate data management tables 5.2 to 5.4. The intermediate data management tables 5.2 and 5.4 are prepared in the same number as the bands and hold respective intermediate data to be drawn in the corresponding bands in a linked structure.

Here, because the character "ℏ" is to be drawn in the band 2, its intermediate data 5.5 to 5.8 are linked to the intermediate data management table 5.3 of the band 2. The intermediate data is structured to hold an area indicating a type of intermediate data, an area indicating a position to be drawn, other drawing information and the like, as much as necessary areas depending on the type of the intermediate data. Specifically, the intermediate data of the character "ℏ" is constituted of a character 5.5 indicating the intermediate data type is a character, a drawing position 5.6 at which "ℏ" is to be drawn, a character code 5.7 indicating the character to be drawn is "ℏ" and information 5.8 indicating a character modification type of, for example, bold characters, voided characters, character color and the like.

Because the straight line drawn in the sheet 5.1 as another example is extended over the band 2 and the band 3, two intermediate data are prepared and linked to the intermediate data management table 5.3 of the band 2 and the intermediate data management table 5.4 of the band 3, respectively.

The intermediate data managed in this manner is, at the time of the printing output, rendered and printed/outputted for each of the bands.

6. Description of FIG. 6 (Banding Memory Diagram)

Figure 6:
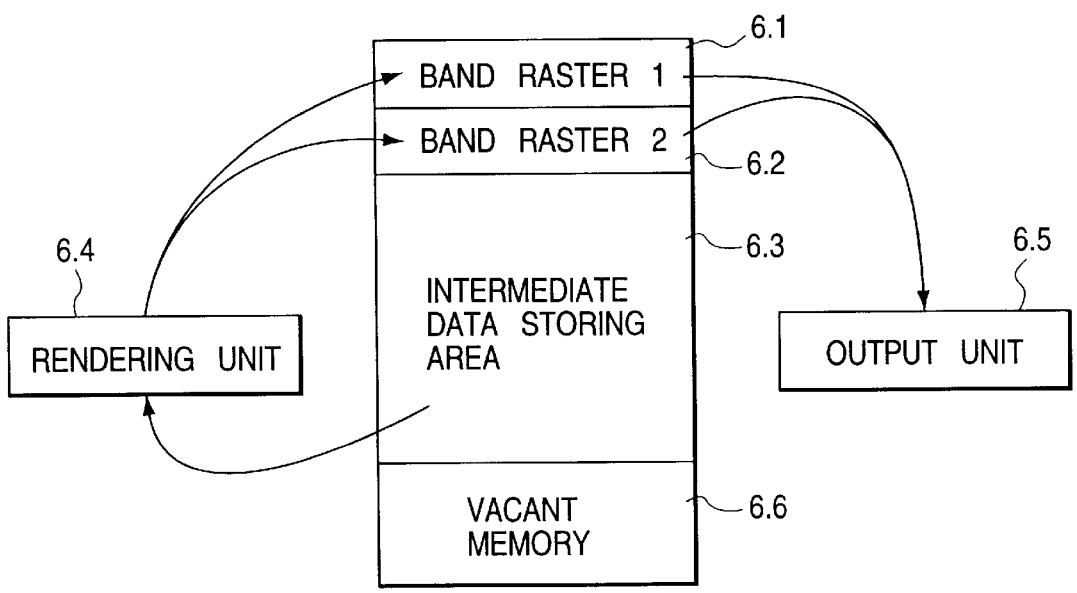
FIG. 6 is an explanatory view of a memory process at the time of an actual printing output of printing data stored in an intermediate data format in the first embodiment of the invention.

FIG. 6 is a diagram for describing a banding process when the printing data stored in the format of intermediate data is practically printed/outputted.

As aforementioned, the intermediate data managed and stored in an intermediate data storing area 6.3 for each of the bands is rendered in a rendering unit 6.4 for each of the bands. A rendered/obtained printing image is stored in either one of first and second band rasters 6.1 and 6.2, and transferred to a print unit 6.5 to be printed/outputted on a sheet.

The printing output process is described later with reference to FIG. 24.

7. Description of FIG. 7 (Banding Timing)

It is described with reference to FIG. 7 which one of the band rasters 6.1 and 6.2 is to s tore the printing image.

Figure 7:
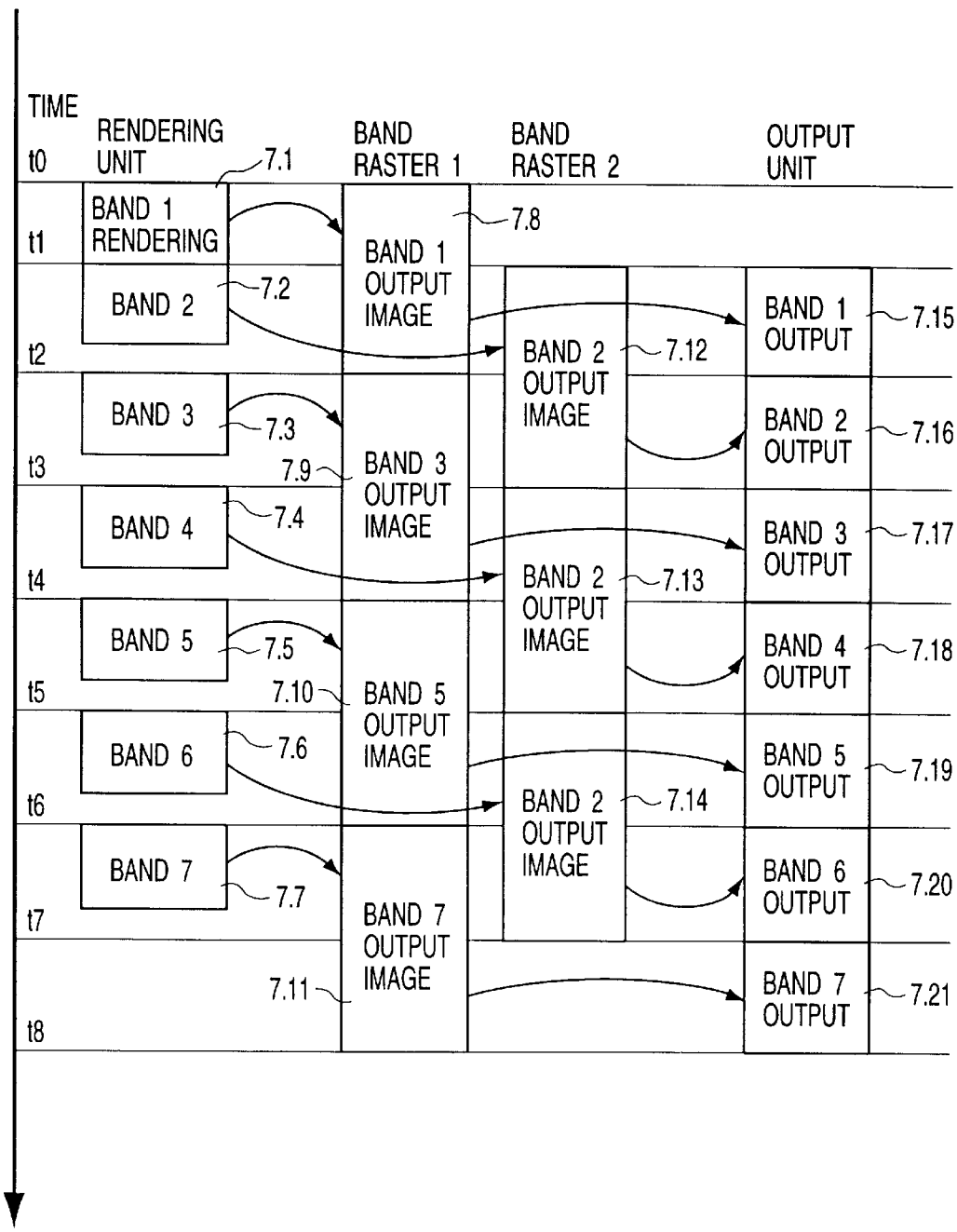
FIG. 7 is a time chart for showing a time relationship in a printing output process in the first embodiment of the invention.

FIG. 7 is a time chart with a vertical axis representing an elapse of time, and shows time-dependent changes in respective processing contents of the rendering unit and the output unit and in output images held in the first and second band rasters.

The figure is now described along th e time axis.

First, during a time period t0 to t1, the rendering unit performs the rendering of the band 1 which is at an uppermost position in the sheet to be first printed/outputted in block 7.1. A resulting output image is stored in the first band raster in block 7.8.

Subsequently, at time t1, the electrostatic drum 1006 is started to rotate (this step is hereinafter referred to as the start of printing output).

After the time t1, the rendering process and the printing output process are executed in parallel. Here, because the area of each band is constant and the rotational speed of the electrostatic drum 1006 is constant, a printing output time (i.e. time period t2 to t1, a time period t3 to t2 and the like) for each band is fixed to a constant value which is determined depending on the rotational speed of the electrostatic drum 1006.

During a time period t1, to t2, in parallel executed are a process 7.15 in which the printing unit prints/outputs the printing image of the band 1 which is already stored in the first band raster and a process 7.12 in which the rendering unit renders the intermediate data of the band 2 which is stored in the intermediate data storing area and stores the printing image in the second band raster.

Likewise, during a time period t2 to t3, the band 2 is printed/outputted in block 7.16, while an output image of the band 3 is developed in the first band raster in block 7.9.

Thereafter, the processes are repeated. Finally, during a time period t7 to t8, band 7 is printed/outputted in block 7.21, thereby completing the printing of one page.

The aforementioned method requires only two band rasters, and therefore the printing output process can be performed with a memory size much less than a memory size necessary for storing the output image of one page. It is needless to say that the number of band rasters is not limited to two, but may be three or more.

Although the printing output time of each band is constant depending on the rotational speed of the electrostatic drum 1006 as aforementioned, a time required for rendering each band varies depending on the intermediate data. Accordingly, if the intermediate data of one band takes much time for rendering, the rendering time of the band becomes longer than the printing output time of another band, causing a failure in the printing output process (print overrun).

In the invention, the above trouble is avoided as follows.

8. Description of FIGS. 8A a nd 8B (Pre-rendering Memory Diagrams)

Figure 8A:
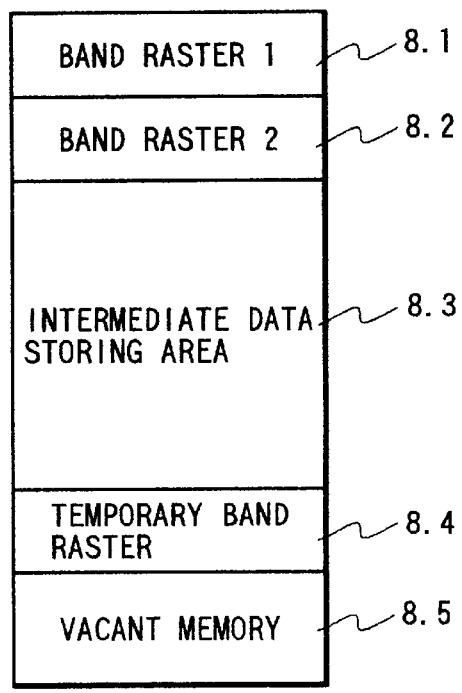
FIGS. 8A and 8B are diagrams for showing a memory process for avoiding print overrun in the first embodiment of the invention.
Figure 8B:
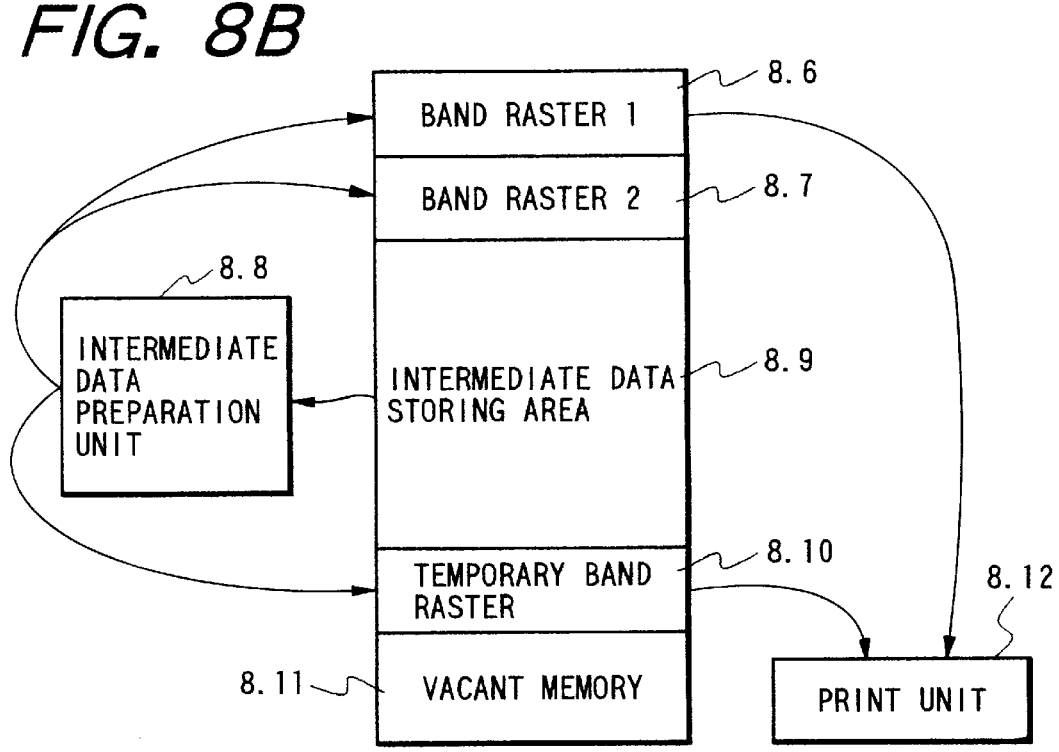

FIGS. 8A and 8B are diagrams for describing a memory process for avoiding the print overrun. Here, by way of example, the case where the rendering time of the band 4 exceeds the band output processing time is considered.

FIG. 8A shows a memory map after the intermediate data of one page has been stored in the intermediate data storing area.

At this time, bands in which print overrun occurs are estimated, and temporary band rasters are reserved as much as the number of the bands. Since only the band 4 is estimated to undergo overrun in this example, one temporary band raster 8.4 is reserved in a portion of vacant memory 8.5. A method of estimating bands which undergo overrun is detailed later with reference to FIGS. 15 and 19.

Processes are detailed later with reference to a flowchart of FIG. 22.

Then, as shown in FIG. 8B, rendering is performed in an appropriate manner by using a first band raster 8.6, a second band raster 8.7 and a temporary band raster 8.10, and printing output is also performed from these band rasters, thereby avoiding the print overrun. Processes are described later with reference to FIG. 24.

A time relationship between rendering and printing output of each band and a usage of the band rasters are now described with reference to FIG. 9.

9. Description of FIG. 9 (Pre-rendering Timing)

Figure 9:
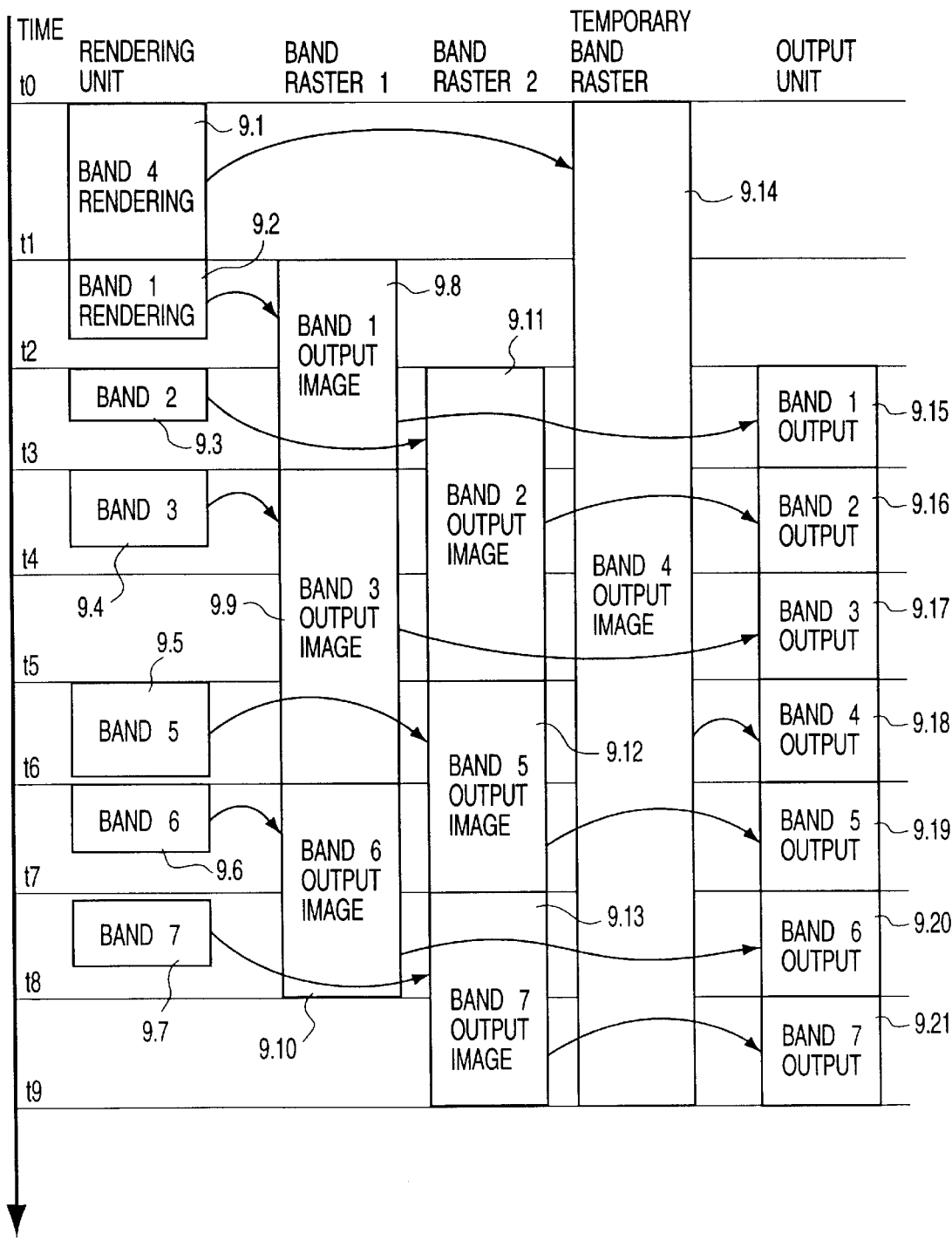
FIG. 9 is a time chart for showing a time relationship between rendering and printing output using a temporary band raster in the process of avoiding print overrun in the first embodiment of the invention.

FIG. 9 is a time chart for describing a time relationship between rendering and printing output using the temporary band raster in the process of avoiding the print overrun.

In the process, different from FIG. 7, two bands are rendered before the start of printing output.

First, during a time period t0 to t1, the intermediate data of the band 4 which has been estimated to cause print overrun is rendered in block 9.1, and a resulting output image is stored in the temporary band raster in block 9.14.

Then, in the same manner as a normal case, the band 1 which is to be first printed/outputted is rendered in block 9.2, and an output image is stored in the first band raster in block 9.8.

Subsequently, at a time t2 printing output is started.

After the time t2, the rendering and the printing output of each band are executed in parallel in the same manner as shown in FIG. 7.

No rendering is performed in a time period t4 to t5 in which the band 4 is rendered in FIG. 7. In a time period t5 to t6 scheduled for printing output of the band 4, the output image of the band 4 which has been already rendered and stored in the temporary band raster is printed/outputted in block 9.18.

Thus, by preparing the temporary band raster and changing the rendering timing, the print overrun can be avoided.

For the case where many bands are estimated to undergo print overrun, or for a low-price model where the RAM capacity of printing apparatus is small, however, temporary band rasters necessary for storing the bands may not be secured because of a deficiency of the memory capacity.

The problem is avoided in the embodiment as follows.

10. Description of FIGS. 10A and 10B (Pre-rendering Compression Memory Diagram)

Figure 10A:
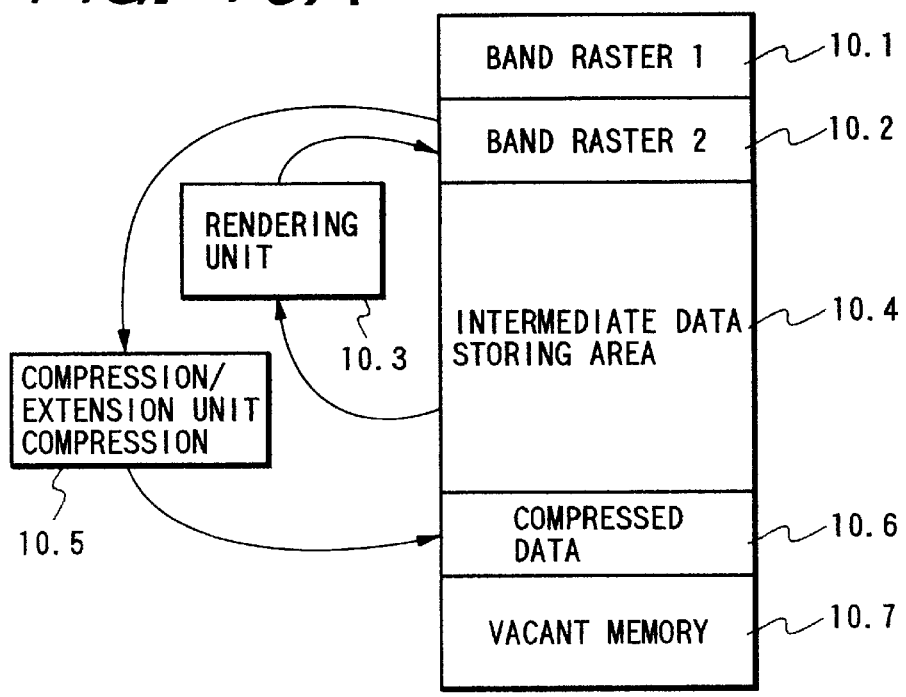
FIGS. 10A and 10B are diagrams for showing a memory process for band compression in the first embodiment of the invention.
Figure 10B:
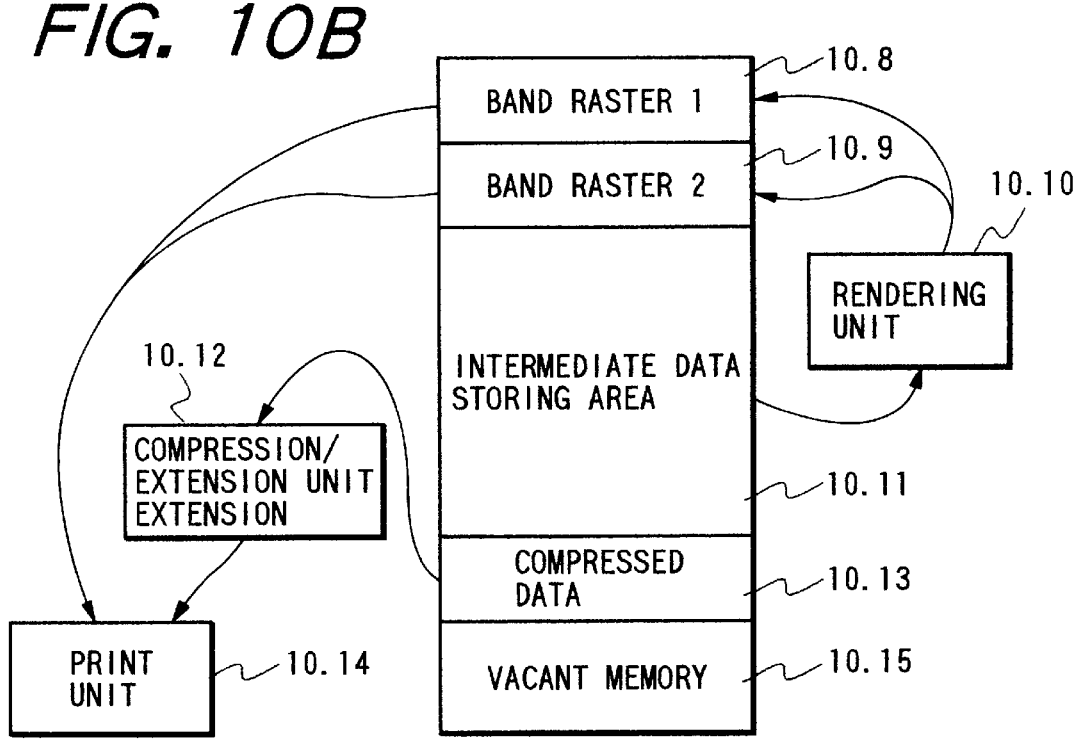

FIGS. 10A and 10B are diagrams showing a memory process executed when temporary band rasters cannot be secured because of a deficiency of the memory capacity.

FIG. 10A shows a process to be performed before the start of printing output. When the temporary band rasters cannot be secured, the band which has been estimated to undergo print overrun is first rendered and stored in a band raster by a rendering unit 10.3. A resulting image is then compressed by using a compression function of a compression/extension unit 10.5, and stored as a compressed data 10.6 in a portion of vacant memory 10.7 (hereinafter, referred to as the band compression process).

Because the compressed data becomes smaller as a result of compression than the data previously stored in a normal band raster, a probability that the print overrun cannot be avoided because of a deficiency in the capacity of the vacant memory 10.7 is reduced. The memory process is detailed later with reference to a flowchart of FIG. 23.

At the time of printing output, as shown in FIG. 10B, normal bands are rendered by a rendering unit 10.10 and printed/outputted by a print unit 10.14, by using first and second band rasters 10.8 and 10.9, while the band stored as a compressed data 10.13 is printed/outputted while it is extended with an extension function of a compression/extension unit 10.12. The process is described later with reference to FIG. 24.

11. Description of FIG. 11 (Pre-rendering Compression Timing)

Figure 11:
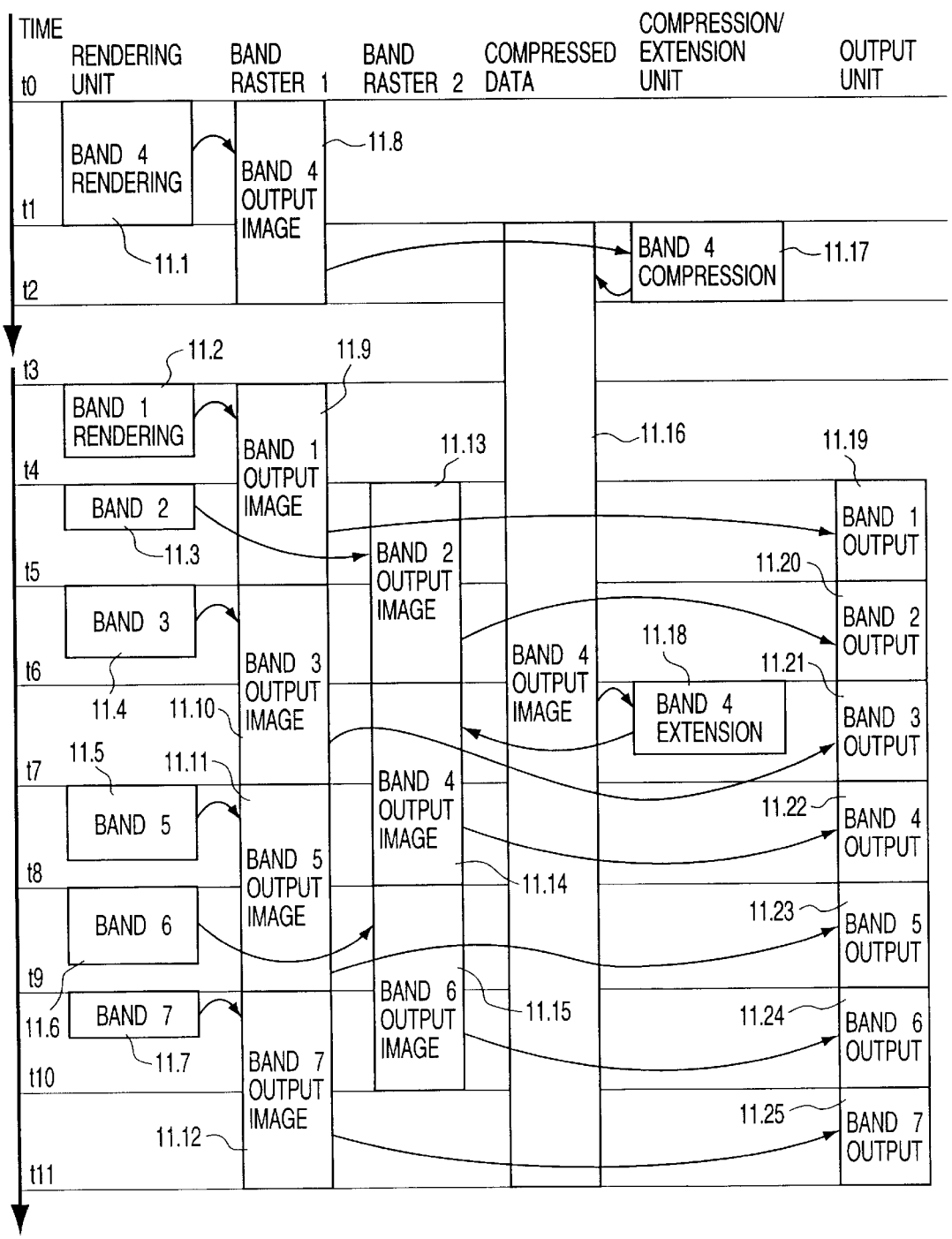
FIG. 11 is a time chart for showing a time relationship between rendering and printing output based on a band compression process in the first embodiment of the invention.

The time relationship between rendering and printing output performed based on the processing method shown in FIGS. 10A and 10B is described with reference to a time chart of FIG. 11. In FIG. 11, it is assumed, by way of example, that the band 4 is estimated to undergo print overrun.

First, during a time period t0 to t2 before the start of printing output, the band 4 which is to undergo print overrun is rendered and stored in the first band raster in block 11.8. A resulting output image is compressed with the compression function of the compression/extension unit in block 11.17 and stored as the compressed data in the RAM in block 11.16.

Subsequently, in the same manner as shown in FIG. 7, during a time period t3 to t4, the head band 1 is rendered in block 11.9, thereby starting the printing output.

The rendering and the printing output of the bands other than the bands which have been estimated to undergo print overrun are performed in parallel. However, for the band 4 having been estimated to undergo print overrun, the compressed data is extended in block 11.18 and stored in the second band raster.

In the above process, a probability that the print overrun cannot be avoided because the temporary band rasters cannot be secured is reduced, as shown in FIGS. 8A and 8B.

Here, unless a processing time required for extending the band (a time period t6 to t7) is shorter than the processing time for the printing output of the band, a print overrun is caused by means of the extension process. Therefore, the compression/extension unit must select a method capable of extending the compressed data at such a speed that the extension process does not cause a print overrun because of its prolonged processing time. It is generally required to employ a compression method having a high extension speed, or speed up the extension process by using hardware or the like.

Even the foregoing method cannot completely avoid the print overrun. If many bands are estimated to undergo print overrun, or if a compression rate of the compressed data is poor, the memory capacity for surely storing the compressed data in the RAM may become deficient.

The above description has been made on an assumption that the intermediate data of one page can be stored in the RAM. In the case of the intermediate data having a very large size, however, the intermediate data sometimes cannot be stored and the printing process sometimes cannot be performed.

In this embodiment the deficiency in capacity of the RAM is avoided as follows.

12. Description of FIGS. 12A and 12B (Page Compression Memory Diagram)

Figure 12A:
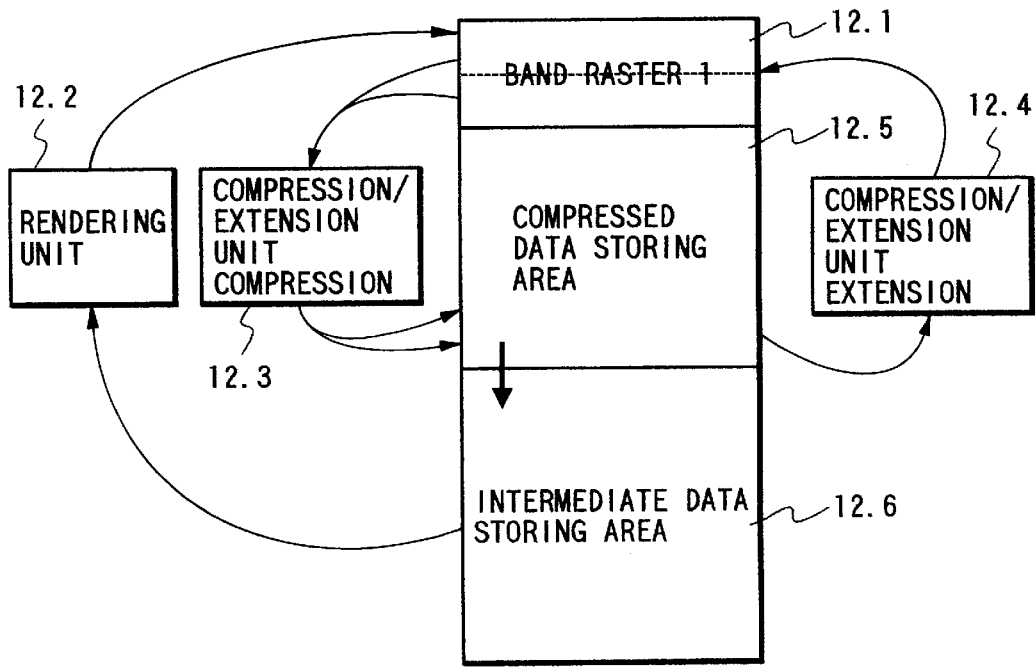
FIGS. 12A and 12B are diagrams for showing a memory process for page compression in the first embodiment of the invention.
Figure 12B:
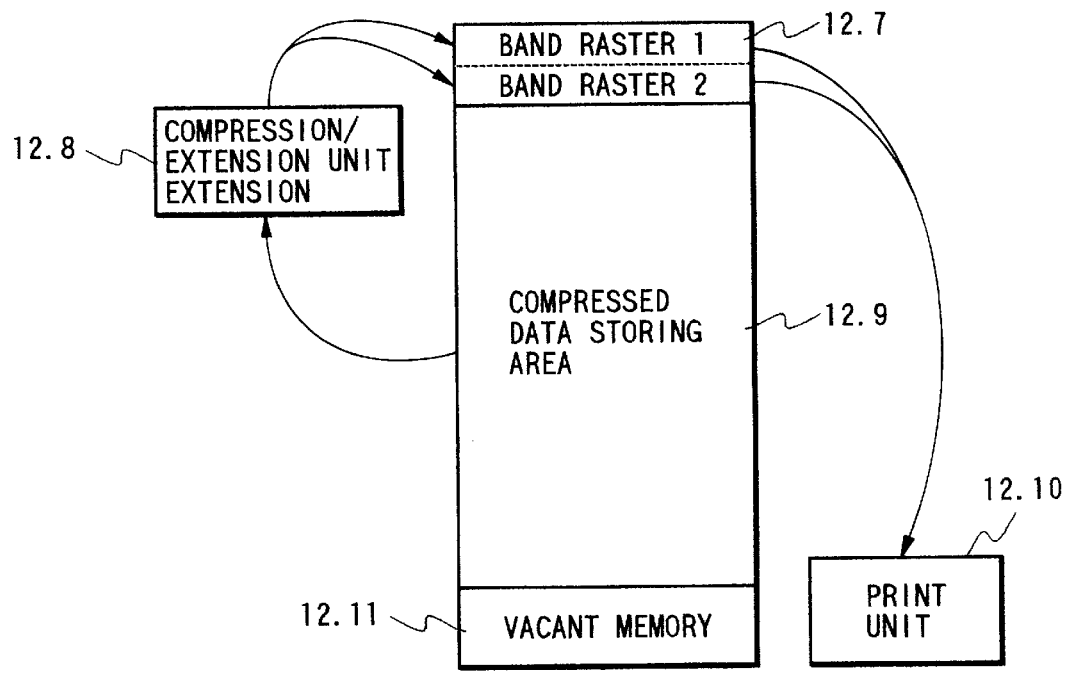
Figure 13:
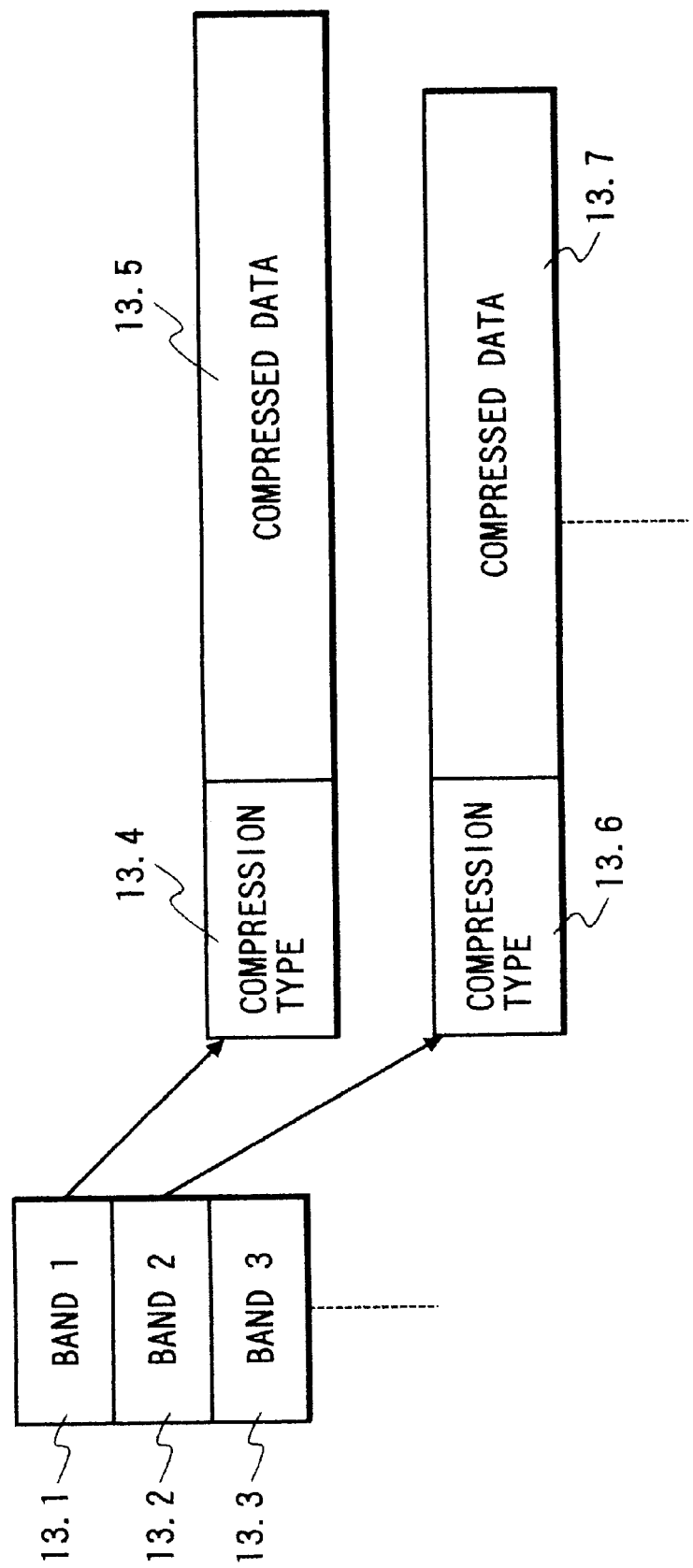
FIG. 13 is an explanatory view of a compressed data management structure when the page compression is performed in the first embodiment of the invention.

FIGS. 12A and 12B are diagrams for describing a memory process to be executed when the intermediate data cannot be stored because of a deficiency of the RAM capacity and a temporary band raster or compressed data cannot be loaded even through the pre-rendering avoiding process.

FIG. 12A shows a process to be executed in the case of the deficiency of the RAM capacity.

When the RAM is deficient in capacity, by using only one band raster 12.1, the intermediate data of all the bands is rendered by a rendering unit 12.2. Subsequently, the band raster 12.1 is divided into two bands as shown by a dotted line in the figure. The bands are converted with a compression function of a compression/extension unit 12.3 into compressed data which is stored in a compressed data storing area 12.5 (hereinafter referred to as the page compression process). As shown in FIG. 12A, the compressed data storing area 12.5 and an intermediate data storing area 12.6 are located on the same RAM. By storing the compressed data in the RAM and simultaneously deleting the intermediate data, the areas are effectively used. Finally, the intermediate data storing area 12.6 is reduced in size to zero.

On the other hand, when the RAM becomes deficient in capacity because of excessively large intermediate data, the intermediate data of one page is not completely stored. In this case, the intermediate data storing area 12.6 is formed again in the RAM which becomes vacant through the compression process, for management of the intermediate data. Then, when the RAM becomes deficient in capacity again, or when the printing data of one page is completely received, the intermediate data is also divided and compressed in the same manner as aforementioned. Therefore, the intermediate data storing area 12.6 is reduced in size to zero. In this case, before the intermediate data is rendered into the band raster 12.1, two compressed data of the same band are extended with an extension function of a compression/extension unit 12.4 and then rendered. Thereby, a printing image of the same band is prepared.

Further, when the RAM becomes deficient in capacity even after compressing all the bands, all the bands are compressed again by a compression method having a higher compression rate. The memory process is detailed later with reference to FIG. 16.

At the time of printing output, as shown in FIG. 12B, a compressed output image of each divided band managed in a compressed data storing area 12.9 is extended with an extension function of a compression/extension unit 12.8, stored in a band raster 12.7 and printed/outputted by a print unit 12.10. Also in this case, by dividing the band raster 12.7 into the same size as at the time of compression and using divided rasters alternately, printing output can be performed in the same manner as in the usual banding process.

The page compression process is described later with reference to FIG. 24.

The method of dividing the band raster 12.7 into two for the output process has been aforementioned. Alternatively, for example, without dividing the band raster, all the intermediate data can be compressed at the time of the printing output, so that the second band raster is formed in a vacant area (vacant memory 12.11).

As aforementioned, the first embodiment is an example of operation modes in the invention. Even when the method of printing output at the time of the page compression is varied, there is no difference in basic method of memory management according to the invention.

13. Description of FIG. 13 (Compressed Data Structure)

Through the foregoing process, all the intermediate data is converted into compressed data. A method of managing the compressed data storing area in that case is now described with reference to FIG. 13.

Each of the compressed data exists in each band. As with the intermediate data, the compressed data is managed by compressed data management tables 13.1 to 13.3.

The compressed data in each band is constituted of a compression type 13.4 or 13.6 indicating by which one of plural compression methods the data was compressed, and a compressed data 13.5 or 13.7 which is obtained by compressing actual output images.

14. Description of FIG. 14 (Page Compression Timing)

The time relationship in the printing output process executed in the case of the page compression process is now described with reference to FIG. 14.

When the page compression process is performed, the printing output process is performed in the same manner as shown in FIG. 7.

First, during a time period t0 to t1, the compression/extension unit extends a compressed data 14.1 of the band 1 into the first band raster in block 14.8 and printing output is then started. Thereafter, processing of one page is ended by completing the printing output of the band 7.

Here, as described above in connection with FIG. 11, an appropriate extension method or circuit is used so that the time required for the extension of the band is shorter than the time required for the printing output of the band.

Through the foregoing processes, all the printing data can be processed without undergoing memory deadlock and print overrun.

15. Description of FIG. 15 (Printing of One Page)

FIG. 15 is a flowchart showing a procedure from receipt of printing data of one page to printing out thereof in a printer control system according to the embodiment of the invention.

At step 15.1, printing data transferred from the host computer 2.1 and received by the input unit 2.3 is converted to intermediate data by the intermediate data preparation unit 2.4.

The format of the intermediate data may be, for example, a format which is easily processed in the rendering unit 2.7, a format in which the size of the intermediate data is reduced, a format in which the intermediate data is processed at a higher speed or other formats suitable for the internal processing.

(Checking of Shift to All Band Compression)

Subsequently at step 15.2, it is determined whether or not the memory is deficient for storing the converted intermediate data in the RAM 2.5. Whether the memory is deficient or not is determined by determining not only whether or not an actual vacant memory size is sufficient, but also whether or not the page compression process described later can be executed. The determination also includes a determination as to which one of plural compression processes should be executed.

A method of the determination is detailed later with reference to FIGS. 18A to 18C.

(Shift to All Band Compression)

Here, if the memory is determined to be deficient, at step 15.3 all the intermediate data prepared so far is rendered while deleting the intermediate data. Bit map images obtained by rendering are compressed by the designated compression method and stored as the compressed data in the RAM 2.5 again. Thereby, a vacant memory sufficient for storing the intermediate data to be processed is secured in the RAM 2.5.

The process guarantees that the intermediate data is prepared without causing memory deadlock.

The full-page compression process is described later with reference to FIG. 16.

Subsequently, at step 15.4 the intermediate data being processed is actually stored in the RAM 2.5.

(Calculation for Pre-rendering)

Next, at step 15.5, calculation for the process of avoiding print overrun is executed.

In the step 15.5, a time required for rending the intermediate data stored at step 15.4 is calculated and collected for each bands. The rendering time is thus measured in units of band.

If the full-page compression process of step 15.3 is executed even once to avoid the memory deadlock, a time required for extending the compressed data is calculated as the rendering time per band.

As an alternative method, when the page compression process of step 15.3 has been already performed, the relevant page may be processed by eventually rendering all intermediate objects and holding all the bands in the format of compressed data. In this case, it can be said that the processing time determined at step 15.3 in units of band is a time required for extending the compressed data in units of band.

The embodiment takes the latter method and employs the compression/extension process in which the extension process can be performed at a sufficiently high speed. This nullifies a possibility that there occurs print overrun because of the extension process. Also, the calculation of the rendering time at step 15.5 is unnecessary for the page which has been already compressed at step 15.3.

The calculation of the rendering time is detailed later with reference to FIG. 19.

Subsequently, at step 15.6, it is determined whether or not the printing data of one page has been processed. If one page is not completed, the subsequent printing data is processed by repeating the process from the step 15.1.

(Processing after All Band Compression)

After the printing data of one page has been processed, it is checked at step 15.7 whether or not the page has been compressed even once at step 15.3. If so, then the process goes to step 15.11 to hold all the printing data as the compressed data as aforementioned.

At step 15.11, the intermediate data prepared after the page compression process of step 15.3 has been executed lastly is rendered and compressed. This process is the same as the page compression process of step 15.3, and is described later with reference to FIG. 16.

Eventually, the printing data of all the bands are held in the RAM 2.5 in the format of compressed data. The process then goes to the printing output process of step 15.14.

(Pre-rendering Process)

On the other hand, if it is determined at step 15.7 that the page compression process has not been executed even once, at step 15.8 the print overrun countermeasure is taken.

In the step, when the rendering time for each band calculated at step 15.5 exceeds a threshold, the print overrun is avoided by rendering the relevant band before the start of printing output.

The threshold is determined from the following formula based on the sheet feeding speed in the printing process and the band size:

threshold=sheet feeding speed×band height/sheet height− overhead, in which the sheet feeding time is a time for feeding one page of sheet determined depending on characteristics of a printing engine, the sheet height is a length of the printing sheet in the sheet feeding direction, the band height is a length of the band in the sheet feeding direction, and the overhead means factors associated with the rendering process of one band except the rendering time.

While the threshold is obtained from the above calculation in the embodiment, it may be determined from a different formula, e.g.,:

threshold = sheet feeding speed × band height/ sheet height − overhead +

(threshold of previous band − rendering time of previous band)

Here, it can be said that when the print-overrun countermeasure is taken for the previous band, the rendering time of the previous band is zero.

As another method, the threshold may be determined as a time period from the time at which the last rendering was finished to the time at which rendering of the relevant band has to be started. Also in this case, the time at which the last rendering was finished means the time of the end of rendering for the last band which is not subject to the countermeasure against the print overrun and located ahead of the band being processed.

At step 15.8, when the rendering time per band exceeds the threshold, a temporary band raster memory for holding the bit map which is obtained by rendering the relevant band is reserved.

When plural temporary raster memories can be reserved, by storing the intermediate data of all the bands that undergo the print overrun in the respective temporary band raster memories prior to the start of printing output, the full page can be printed/outputted without causing the print overrun. The print overrun countermeasure is detailed later with reference to FIG. 22.

Subsequently, if it is determined at step 15.9 that there is a vacant area in the capacity of the RAM 2.5 enough to secure the temporary band raster memories necessary for carrying out the print overrun countermeasure for all the relevant bands in the process of step 15.8, then all the bands that undergo print overrun are rendered and thereafter actually printed/outputted on a sheet at step 15.14. This printing output process is described later with reference to FIG. 24.

(Pre-rendering Compression Process)

If it is determined at step 15.9 that the temporary band raster memories for the print overrun countermeasure cannot be secured, then at step 15.10 the bands undergoing print overrun are rendered, and resulting bit map images are compressed and stored in the RAM 2.5 in the format of compressed data.

As aforementioned, since the extension speed of the compressed data is sufficiently higher than the sheet feeding speed in the embodiment, any compressed band does not cause print overrun.

Subsequently, at step 15.12, it is determined whether or not all the bands undergoing print overrun can be stored in the RAM 2.5. If the memory is not deficient, the printing output process of step 15.14 is performed.

If the print-overrun bands cannot be stored in the RAM 2.5 even after compressed, at step 15.13 the page compression process is executed on all the bands including the bands not undergoing print overrun in the same manner as in steps 15.3 and 15.11. The process is described later with reference to FIG. 16.

After the printing data of one page is stored in the RAM 2.5 in the format of intermediate data or compressed data with a guarantee that the print overrun does not occur, at step 15.14 printing output is actually performed onto a sheet of paper. The process is described later with reference to FIG. 24.

16. Description of FIG. 16 (All Band Compression)

Figure 16:
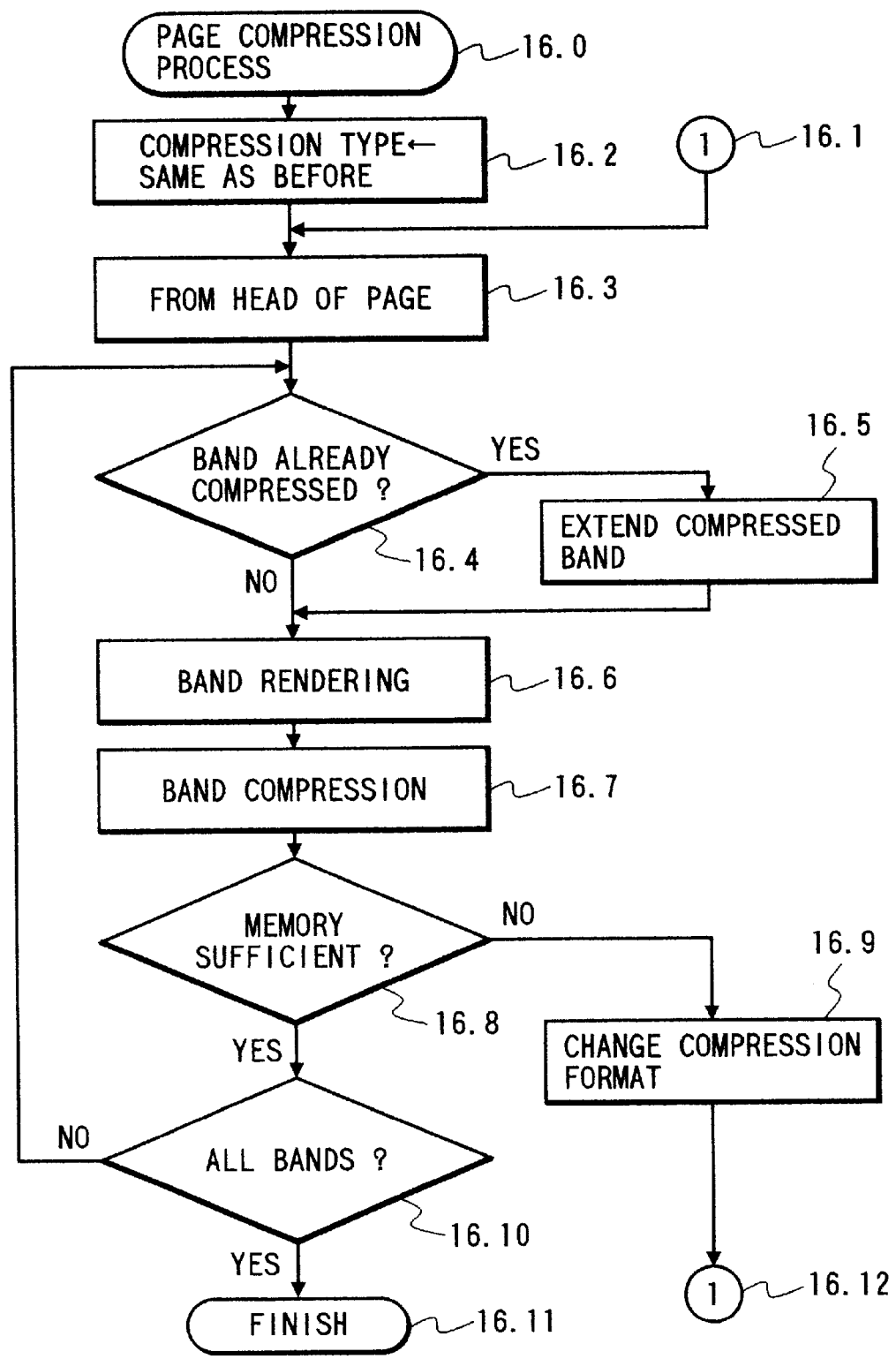
FIG. 16 is a flowchart of a page compression process in the first embodiment of the invention.

FIG. 16 is a flowchart of the process for rendering all the bands for further compression and storing the printing data as compressed data instead of intermediate data when the vacant capacity of the RAM 2.5 is deficient, as described in connection with the steps 15.3, 15.11 and 15.13 in FIG. 15.

The process is executed for all the bands. Each of the bands is constituted of one of two types of data; i.e., compressed data resulting from the page compression process if it has been already executed, and intermediate data for the printing data which is received after the last page compression process. When the page has not been even once compressed, the band is constituted of the intermediate data only.

First, at step 16.1, the type of compression process to be executed thereafter is set to the same as before. Then, steps 16.3 to 16.10 are executed repeatedly for all the bands in sequence from the head band of the page.

In the repeated process, it is first checked at step 16.4 whether or not the band to be processed holds compressed data.

If so, at step 16.5 the compressed data is extended by the compression/extension unit 2.8 in accordance with its compression type. Subsequently, the original compressed data is deleted to increase a vacant area of the RAM 2.5 as much as possible. Resulting bit map data is stored in a band raster area which is employed in normal printing output.

Subsequently, at step 16.6, the intermediate data of the relevant band is added to the bit map data and rendered. Thereafter, the intermediate data is deleted, to further increase a vacant area of the RAM 2.5.

Finally at step 16.7, a resulting bit map data is compressed by the compression/extension unit 2.8 in the designated compression type, and stored in the RAM 2.5 again.

From the determination as to memory deficiency at step 15.2 of FIG. 15, it is expected that the vacant capacity of the RAM 2.5 will not become deficient. Depending on data, however, memory deficiency occurs because of a poor compression rate. If it is determined at step 16.8 that the memory is deficient, at step 16.9 the compressed format is changed to another format having a higher compression rate, followed by repeating the process from the step 16.3. The changing of the compression format is described later with reference to FIGS. 17A and 17B.

In order that the above process is executed for all the bands in the page, it is determined at step 16.10 whether or not all the bands are processed.

17. Description of FIGS. 17A and 17B (Plural Compression Formats)

Figure 17A:
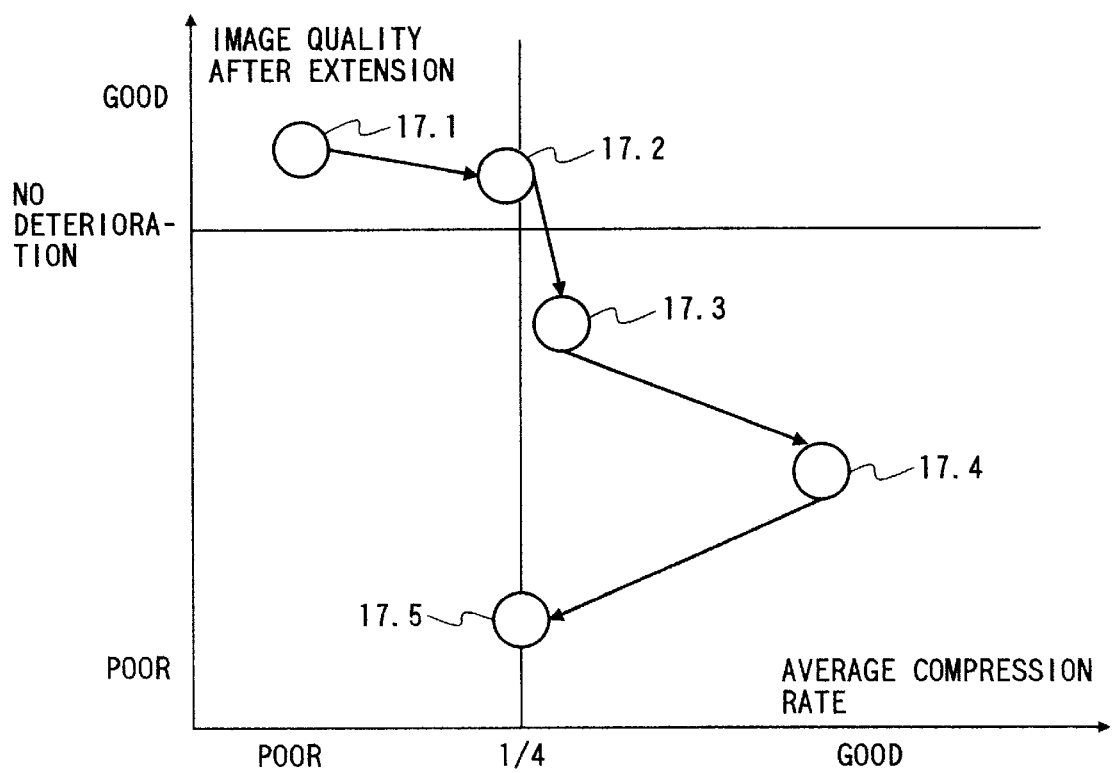
FIGS. 17A and 17B are charts for showing examples of a manner of selecting one of plural compression types in the first embodiment of the invention.
Figure 17B:
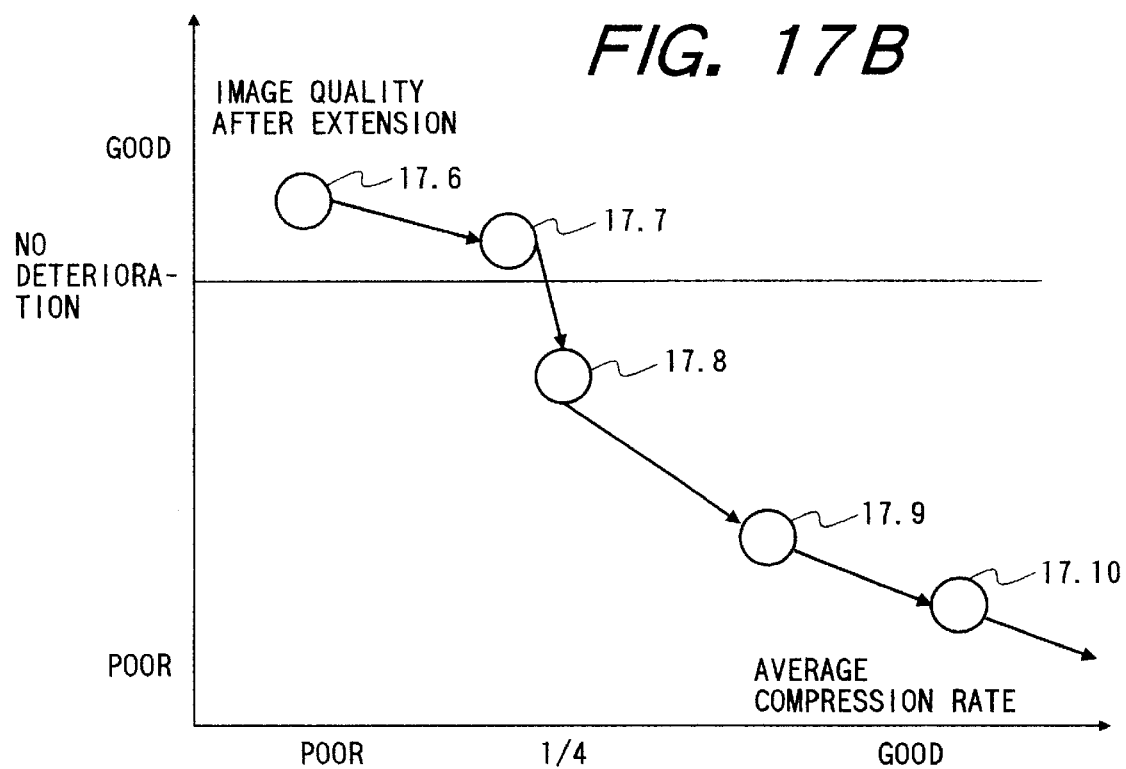

FIGS. 17A and 17B are charts showing examples of a manner of selecting from plural compression formats.

In FIG. 17A, the horizontal axis represents an average compression rate, and the size of data after compression becomes smaller toward the right of the axis. The vertical axis represents a deterioration in image quality in the compression process, and the image quality deteriorates less toward an upper portion along the axis. In an area above the line indicating no deterioration, the image quality is substantially the same as the original (LossLess compression).

When memory deficiency occurs during the page compression process with an initial compression type 17.1, the page compression is tried again by using a compression type 17.2 having a higher compression rate. If memory deficiency still occurs, a compression type 17.3 is now selected. If memory deficiency still occurs, a compression type 17.4 is selected. In this manner, the compression type is changed.

When memory deficiency still occurs even at the finally selected compression rate, the memory deficiency is solved by using a method in which the data size after conversion can be reliably calculated, e.g., a thinning process, although the image quality is considerably deteriorated. In FIG. 17A, a compression type 17.5 is employed because the data size after conversion is reduced down to ¼.

Of course, the memory is here assumed to have such a capacity as that when the page compression is made in the compression method having a compression rate of ¼, all the bands can be stored in the memory. With this assumption, all the printing data can be printed without causing memory deadlock.

In an alternative method shown in FIG. 17B, image processing is performed by using a band pass filter, for example, to increase the compression rate. In the method, by repeating a filtering process until memory deficiency does not occur, the state of memory deficiency can be substantially avoided.

18. Description of FIGS. 18A, 18B and 18C (Determination as to Shift to All Band Compression)

FIGS. 18A, 18B and 18C are diagrams showing a manner of making the determination at step 15.2 of FIG. 15 as to whether or not the memory vacant area required for the page compression process is deficient, and a manner of selecting the compression processing method to be executed. These figures show a process for one band when the page compression process is executed.

FIG. 18A schematically shows areas in the RAM 2.5 which are resulted by extending the compressed data of the band (step 16.2 of FIG. 16) and rendering the intermediate data (step 16.3 of FIG. 16) in the page compression process.

Numeral 18.1 is a vacant area of the RAM 2.5, 18.2 is the compressed data of the band to be processed, 18.3 is the intermediate data of the band and 18.4 is the printing data related to other bands. However, when the page compression process is first executed on the relevant page, the compressed data 18.2 does not exist.

In the page compression process, the compressed data 18.2 of the band to be processed is first extended and the intermediate data 18.3 is then rendered. After these steps, the compressed data 18.2 and the intermediate data 18.3 become unnecessary, and the areas can be made empty as shown in FIG. 18B.

Thereafter, the bit map data of the relevant band is again compressed and stored in a vacant area 18.5. The state after the storing is shown in FIG. 18C where 18.8 represents the compressed data stored again.

In the page compression process, a sequence of the aforementioned steps are executed for all the bands. It can be determined by checking sizes of the vacant areas 18.1 and 18.7 for each band whether or not the memory size required for the page compression process is deficient.

In the compression process, the size after compression depends on various factors, e.g., dot distribution of the bit map image to be compressed, and cannot be practically calculated before the compression. Also, the compression efficiency changes depending on the compression method. Therefore, the data size after compression is calculated based on a compression rate estimated from the compression method.

In the first embodiment, the estimated compression rate is defined as average compression efficiency in the compression method. It is needless to say that the size after compression can also be estimated from other methods.

A manner of measuring the vacant area is now described with reference to FIGS. 18A to 18C.

Assuming for some band k that the size of the vacant area 18.7 is Sk, the size of the compressed data 18.2 of the band is Bk, the size of the intermediate data 18.3 is Pk and the estimated size of the again compressed data 18.8 is Ak, then the relationship between the size S(k−1) of the vacant area 18.1 before the banding process and the size Sk of the vacant area 18.7 after the banding process is expressed below from FIGS. 18A to 18C:

$$Sk=S(k-1)+Bk+Pk-Ak$$

Also, assuming that a total memory size available for the process is M and the number of bands is n, a size SO of a vacant area before the processing of all the bands is expressed by:

$$SO=M-(B1+B2+\ldots+Bn)-(P1+\ldots+Pn)$$

Here, because Bk, Pk are known for all the bands, by using the estimated value Ak, Sk can be calculated for all the bands. A minimum value MIN(Sk) represents a minimum value of the memory vacant capacity in the page compression process.

At step 15.2 of FIG. 15, it can be determined whether or not the page compression process can be executed, by determining whether or not the value of MIN(Sk) is zero or more.

Here, if MIN(Sk) is less than zero, the page compression process cannot be executed, and therefore the minimum value is calculated again after changing the compression method to another method.

As a generally known feature of the compression process, the process having a high compression efficiency lowers the processing speed and largely deteriorates the image quality. On the contrary, the process having a low compression efficiency increases the processing speed and can compress data with a less deterioration in image quality (some compression method causes no deterioration in image quality).

In the first embodiment, the printing data of one page can be held without substantially causing a memory deadlock state, while minimizing a deterioration of image quality and a speed reduction by employing one of the compression methods providing MIN(Sk) of zero or more which minimizes the deterioration of image quality.

19. Description of FIG. 19 (Rendering Time Calculation)

Figure 19:
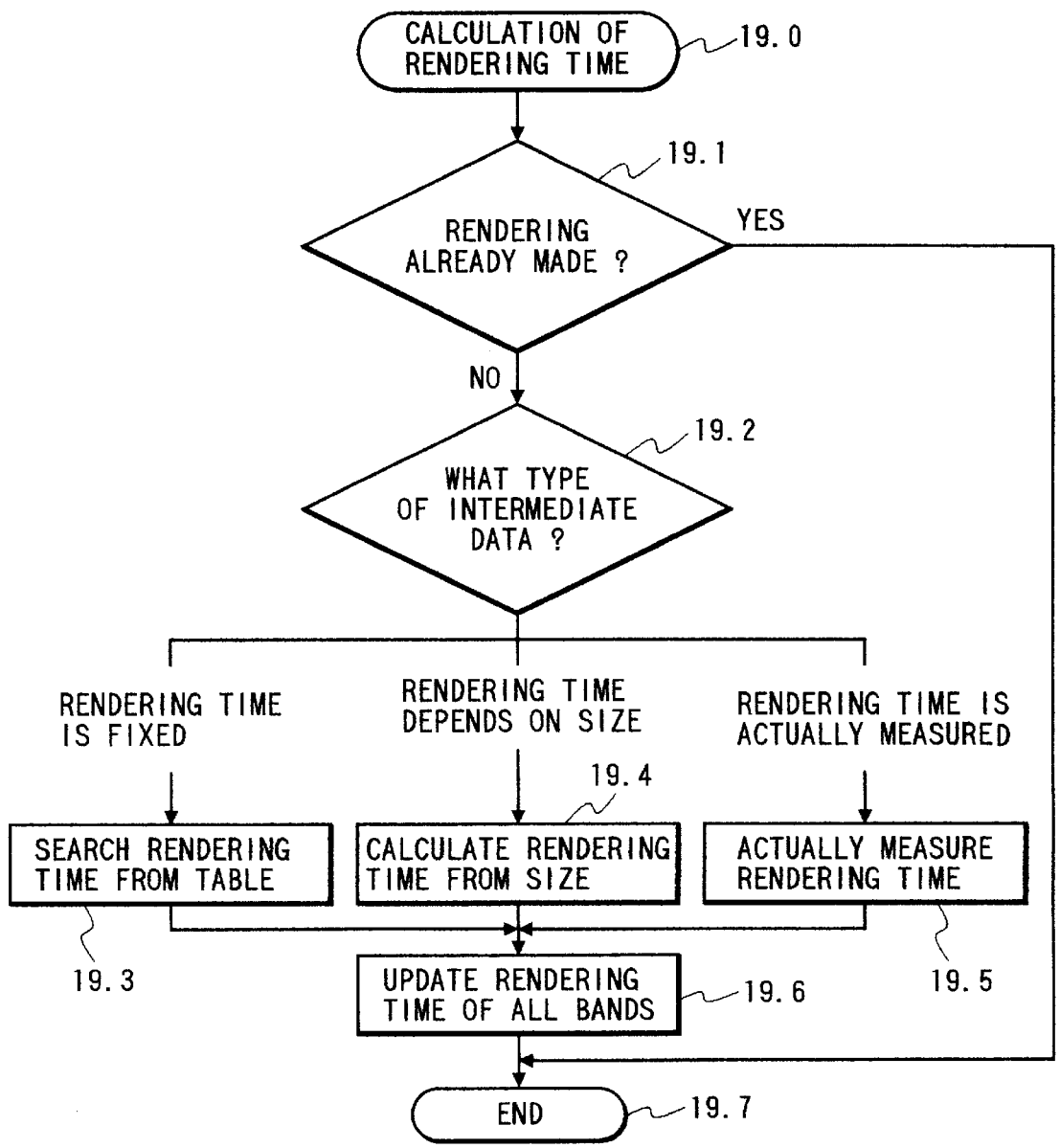
FIG. 19 is a flowchart of a process for calculating rendering time in the first embodiment of the invention.

FIG. 19 is a flowchart of a method for calculating the rendering time in units of band which is performed at step 15.5 of FIG. 15. The rendering time obtained here is compared with the threshold in the print overrun countermeasures of step 15.8 in FIG. 15.

Since it is determined that the vacant memory capacity is deficient when the printing data is stored in the memory, it is first determined at step 19.1 whether or not the page compression process has been executed at step 15.3 of FIG. 15. If the page has been compressed, the print overrun countermeasure of step 15.8 is not executed as aforementioned. In this case, the control process is immediately finished.

Subsequently, at step 19.2 a method of calculating the rendering time is selected depending on the type of the intermediate data.

As an example, when the intermediate data is of the type that the rendering time is fixedly defined, the process branches to step 19.3 where the rendering time is obtained from, e.g., a correspondence table in which the rendering time is held beforehand corresponding to the intermediate data. The process is described later with reference to FIG. 20.

As another example, when the intermediate data is of the type, for example, like an image bit map, that the rendering process is executed by simply copying memory contents, the process branches to step 19.4 where the rendering time is calculated from the size of the intermediate data.

As still another example, when the intermediate data is of the type that the rendering time is unknown until the rendering is actually performed, the process branches to step 19.5 where the rendering process is actually executed to measure the rendering time. The process is described later with reference to FIG. 21.

It is a matter of course that the aforementioned branched steps may also be executed by using types of algorithms for calculating the rendering time other than described above.

After executing the rendering time calculation process depending on the type of the intermediate data, at step 19.6 the calculated time is added to the rendering time of the entire band, thereby ending the process.

20. Description of FIG. 20 (Rendering Time Calculation-Fixed Table System)

Figure 20:
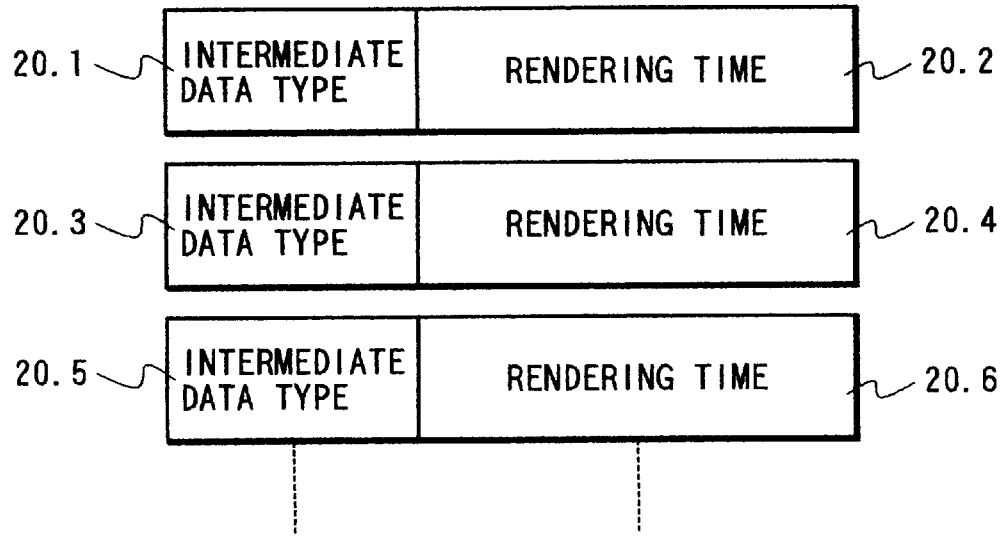
FIG. 20 is an explanatory view of a fixed table method for calculating the rendering time in the first embodiment of the invention.

FIG. 20 is a diagram for describing an example of the process of obtaining the fixed rendering time at step 19.3 of FIG. 19.

For the intermediate data whose rendering time is fixedly known beforehand, as shown in FIG. 19, the rendering time is retrieved from a correspondence table of an intermediate data type and the corresponding rendering time.

21. Description of FIG. 21 (Rendering Time Calculation-Actual Measurement System)

Figure 21:
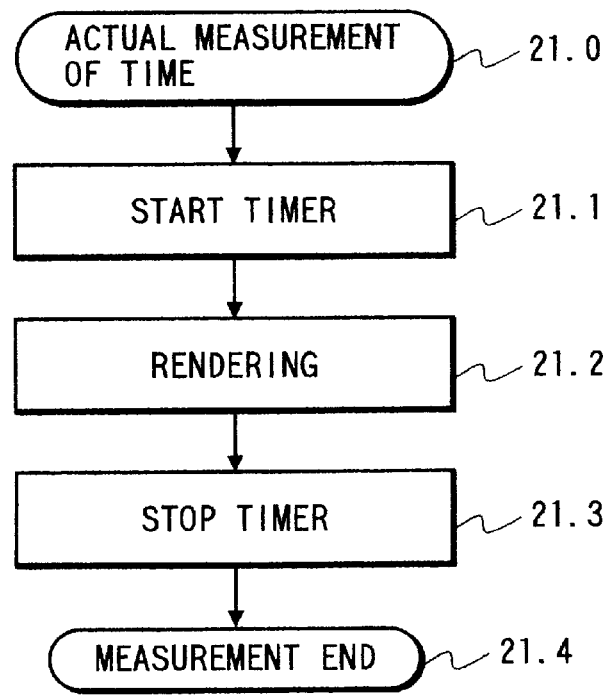
FIG. 21 is a flowchart of a process for actually calculating the rendering time in the first embodiment of the invention.

FIG. 21 is a flowchart for describing an example of the process of actually measuring the rendering time at step 19.5 of FIG. 19.

At step 21.1 an internal timer of the printing apparatus is started, and at step 21.2 the intermediate data to be measured is rendered in the same manner as the actual rendering. Upon completion of the rendering, the timer is stopped at step 21.3 and a taken time period is given as the rendering time.

22. Description of FIG. 22 (Overrun Countermeasure)

Figure 22:
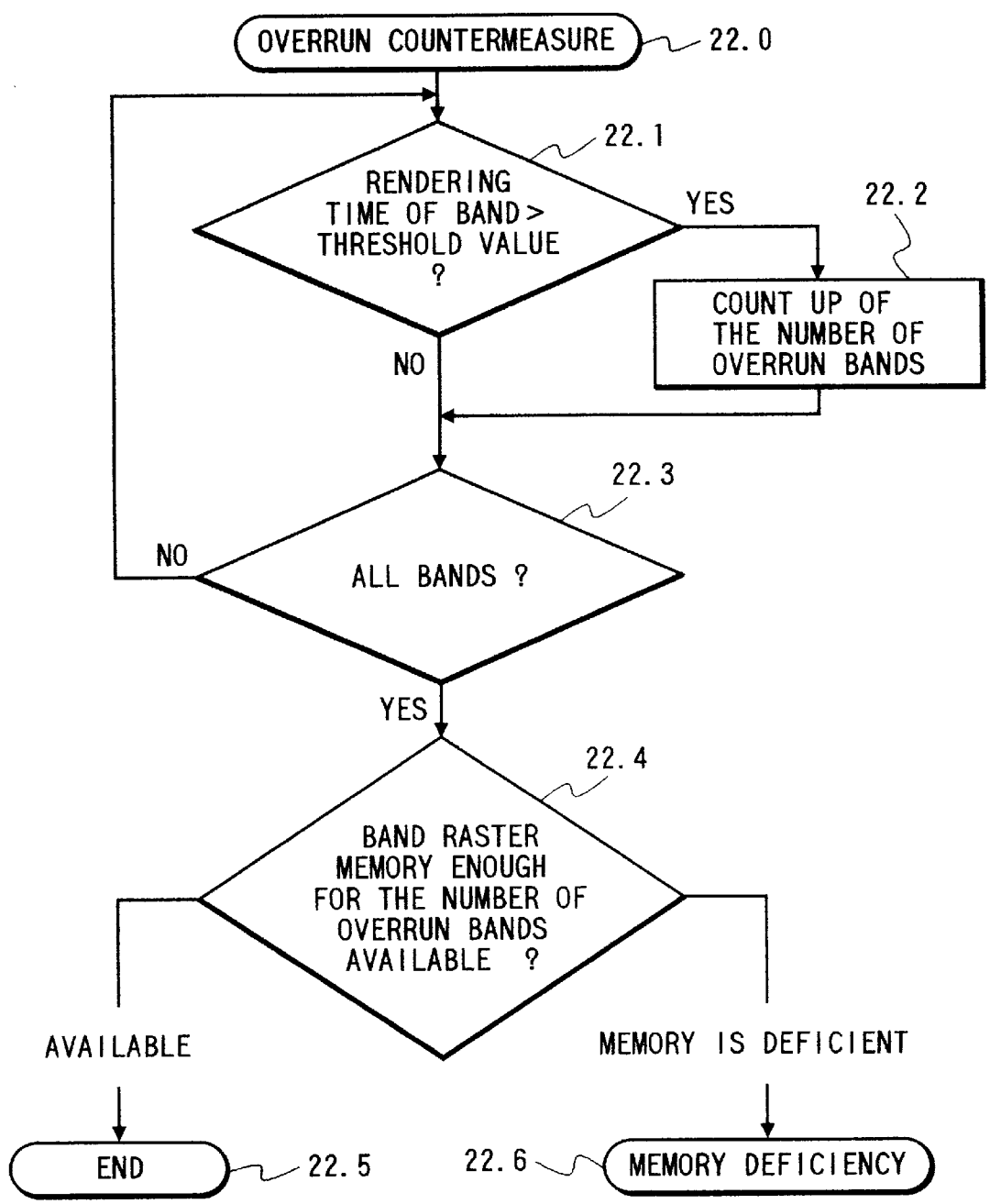
FIG. 22 is a flowchart of a countermeasure for print overrun in the first embodiment of the invention.

FIG. 22 is a flowchart for describing the overrun countermeasure process executed at step 15.8 of FIG. 15.

As aforementioned, first at step 22.1 the rendering time of the entire band is compared with the threshold described in connection with step 15.8. If the rendering time exceeds the threshold, at step 22.2 the bands undergoing print overrun are counted up.

The process of steps 22.1 and 22.2 are repeated until all the bands are processed at step 22.3.

After the counting-up process is completed for one page, at step 22.4 it is determined whether or not temporary band rasters corresponding to the number of print-overrun bands are available in the vacant area of the RAM 2.5 at present. The determination result is considered as the process result at step 22.5 or 22.6, thereby ending the process.

If memory deficiency is determined in the process, the band compression process described below is executed.

23. Description of FIG. 23 (Band Compression Process)

Figure 23:
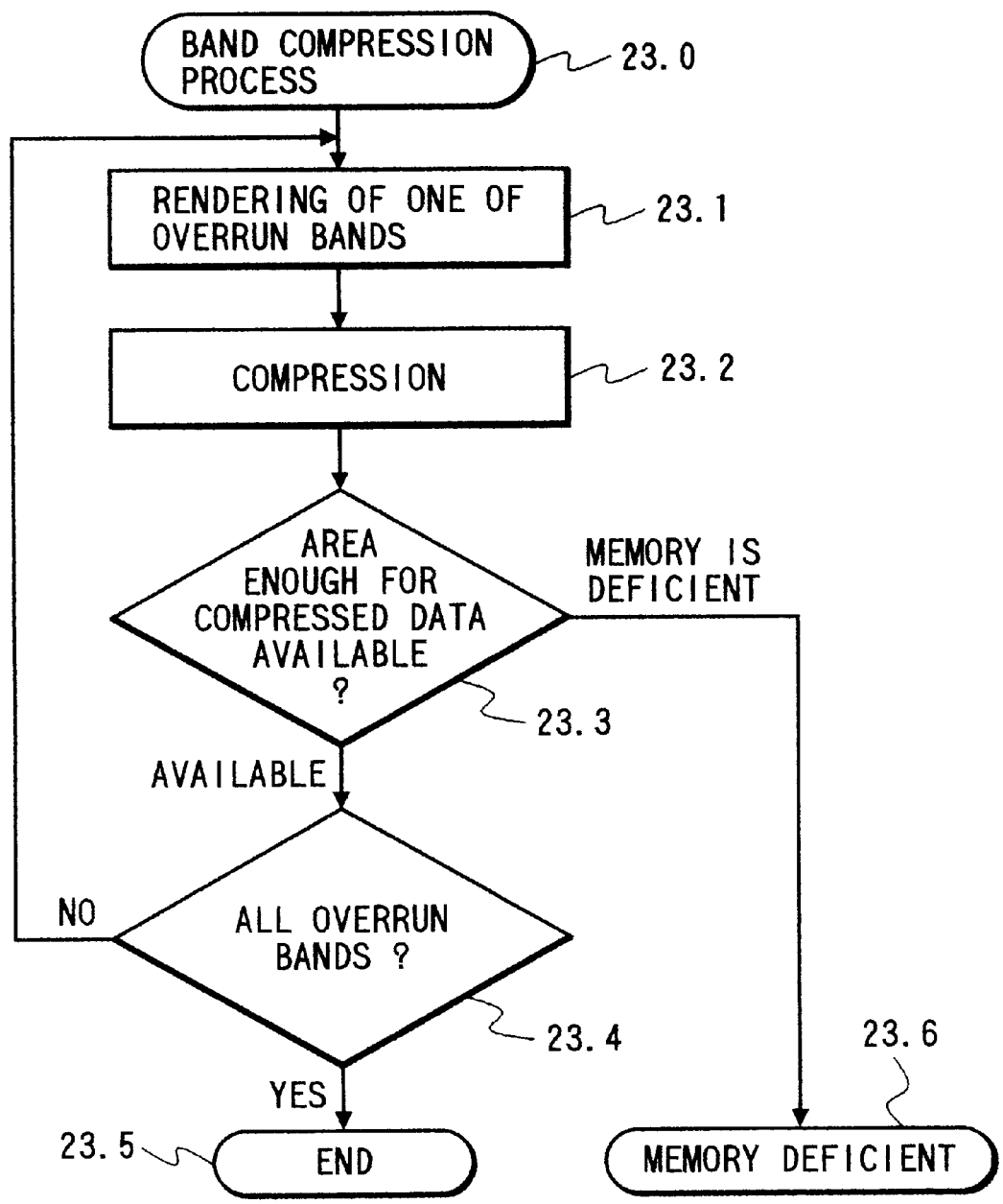
FIG. 23 is a flowchart of a band compression process in the first embodiment of the invention.

FIG. 23 is a flowchart for describing the band expression process of converting the intermediate data of the band into compressed data when temporary band raster areas for the print-overrun bands cannot be secured because of the deficient vacant areas in the RAM 2.5, as described in connection with step 15.10 of FIG. 15.

First at step 23.1 one of the overrun bands is rendered. Subsequently, at step 23.2 the obtained bit map image is converted to the compressed data using the compression function of the compression/extension unit 2.8.

Subsequently, it is determined at step 23.3 whether or not the compressed data can be stored in the vacant area of the RAM 2.5. If the vacant area is not available, it is determined at step 23.6 that the memory is deficient, thereby ending the band compression process.

When the compressed data can be stored in the memory, the process is repeated from the step 23.1 until it is determined at step 23.4 that all the overrun bands are processed.

When the process ends by determining that the memory is deficient, as aforementioned, the process of compressing the full page of step 15.13 in FIG. 15 is executed.

24. Description of FIG. 24 (Printing Output Process)

Figure 24:
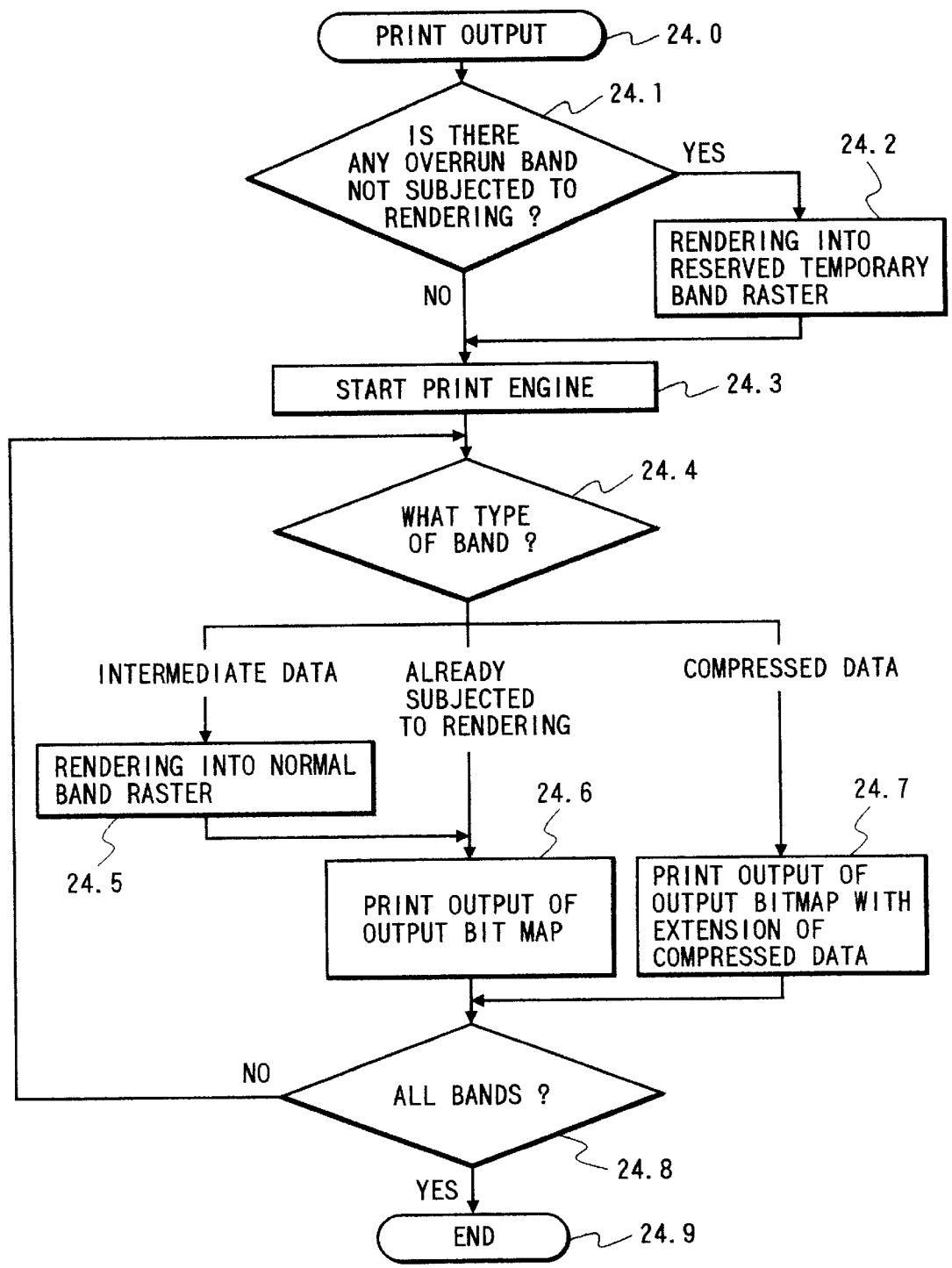
FIG. 24 is a flowchart of a printing output process in the first embodiment of the invention.

FIG. 24 is a flowchart for describing the printing output process shown at step 15.14 of FIG. 15.

First, the process is executed for the temporary band rasters for the print-overrun bands, which are secured through the print-overrun countermeasure shown in FIG. 22.

It is determined at step 24.1 whether or not there are temporary band rasters for the overrun bands. If the temporary band rasters are secured, at step 24.2 the intermediate data of the corresponding band is rendered into the temporary band raster.

At this time, since the printing engine is not started, no print overrun occurs even when the rendering process takes time.

Subsequently, at step 24.3 the printing engine is started to actually print/output on a sheet of paper.

It is then determined at step 24.4 in which format the printing data of the relevant band is held.

If the printing data is intermediate data, the process branches to step 24.5 where the intermediate data is rendered and stored in a normal band raster area.

In the rendering process, since the print-overrun bands are omitted beforehand as aforementioned, no print overrun phenomenon occurs.

Subsequently, at step 24.6 the obtained printing image is printed/outputted on a sheet of paper.

If it is determined at step 24.4 that for the printing data of the band the intermediate data is already rendered and stored in the temporary band raster, then the printing data can be immediately printed/outputted. Therefore, at step 24.6 the printing output is performed.

If the printing data of the relevant band is the compressed data prepared by the band compression process or the page compression process, printing output is performed at step 24.7 while extending the compressed data. In this case, as aforementioned, because the speed of the extension process is set in the embodiment to be sufficiently higher than the engine output speed, no print overrun occurs.

Finally, it is determined at step 24.8 whether or not all the bands are printed/outputted. If not yet printed/outputted, the process is repeated from the step 24.4.

As aforementioned, according to the first embodiment, a guarantee that all pages are surely printed can be realized inexpensively while suppressing the memory capacity to some degree without causing print overrun and memory deadlock.

Also, the feature of converting image data by the compression process provides another advantage that printing with high resolution can be achieved with less memory capacity.

SECOND EMBODIMENT

25. Description of FIG. 25 (Block Diagram of Second Embodiment)

Figure 25:
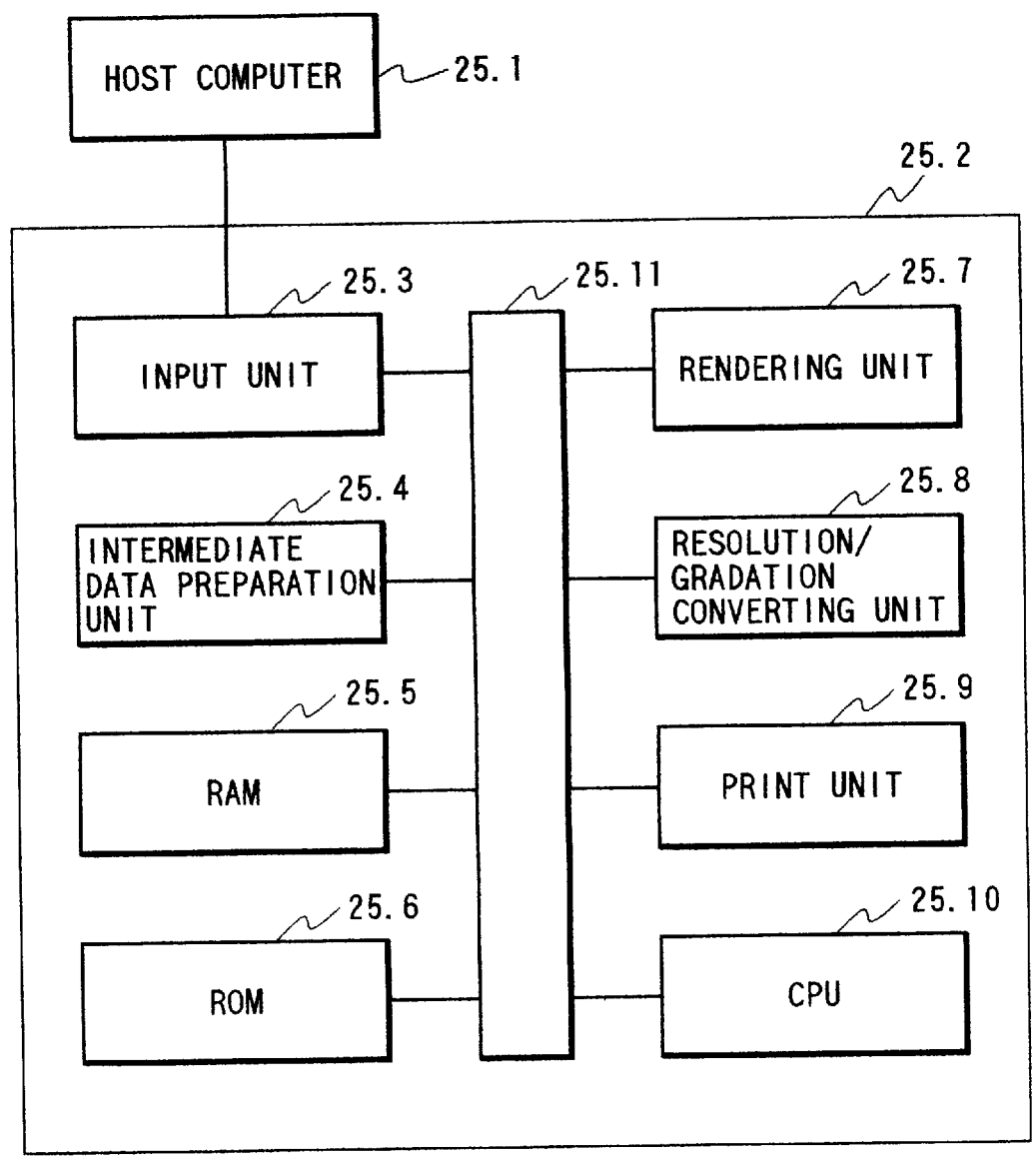
FIG. 25 is a block diagram showing a constitution of a printer control system according to a second embodiment of the invention.

FIG. 25 is a block diagram for describing the constitution of a printer control system in another embodiment of the invention. Here, a laser beam printer (see FIG. 1) is described by way of example.

The printing apparatus according to the second embodiment has a feature that data conversion is performed by a resolution/gradation converting unit to reduce a size of the rendered printing image.

The resolution/gradation converting unit 25.8 reduces resolution or gradation of the rendered printing image. For example, the resolution is reduced by a method of thinning dots of the image, and the gradation is reduced by using a dithering process generally known.

Numeral 25.5 denotes a RAM similar to the RAM 2.5 in FIG. 2. The RAM 25.5 is used in the same manner as in the first embodiment. However, the RAM 25.5 is larger than the size of the printing image of one page after the data conversion is performed by the resolution/gradation converting unit 25.8.

For example, when an A4-size sheet of paper is printed by a color printer having a printing ability of 8 bits for each of four planes of YMCK with 600 DPI, the size of a printing output image is about 128 M bytes. However, if resolution of the printing image is reduced to 300 DPI through resolution conversion and the number of output bits is converted to one bit through gradation conversion, then the size of the printing output image is about 4 M bytes.

Therefore, the RAM 25.5 has a feature that it has a size of at least 4 M bytes plus working area.

Other sections in FIG. 25 function in the same manner as the corresponding sections of the first embodiment.

26. Description of FIG. 26 (One Page Printing)

A procedure of printing one page in the second embodiment is basically similar to the procedure in the first embodiment described with reference to FIG. 15, but is featured in that the data conversion process is performed as resolution conversion/gradation conversion. The procedure is now described.

Figure 26:
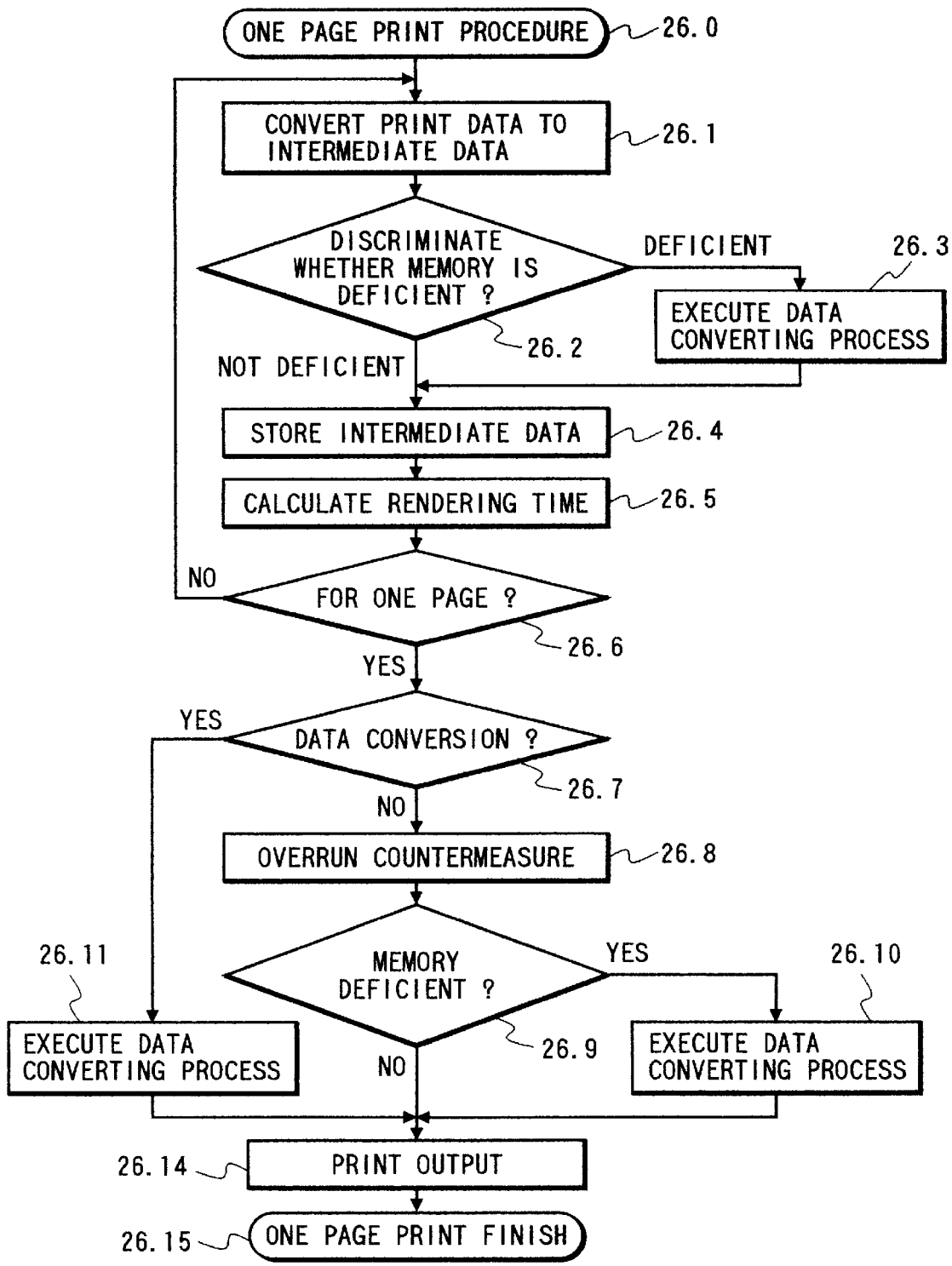
FIG. 26 is a flowchart of a procedure of printing one page in the second embodiment of the invention.

FIG. 26 is a flowchart showing a procedure from receipt of printing data of one page to printing output thereof in the printer control system according to the second embodiment of the invention.

At step 26.1, in the same manner as at step 15.1 of FIG. 15, printing data transferred from a host computer 25.1 and received by an input unit 25.3 is converted to intermediate data by an intermediate data preparation unit 25.4.

(Checking of Shift to Degradation)

Subsequently, it is determined at step 26.2 whether or not a memory is deficient for storing the converted intermediate data in the RAM 25.5. Whether or not the memory is deficient is determined by determining not only whether or not an actual vacant memory size is sufficient, but also whether or not the data compression process described below can be executed.

A method of making the determination is detailed later with reference to FIGS. 27A to 27C.

(Shift to Degradation)

If the memory is determined to be deficient, at step 26.3 all the intermediate data prepared so far is rendered, data-converted (resolution conversion/gradation conversion) and again stored in the RAM 25.5. In this case, the intermediate data is deleted to secure in the RAM 25.5 a vacant memory as much as possible for storing the intermediate data to be processed.

As aforementioned, the RAM 25.5 has a capacity enough to hold the printing image of one page obtained after the data conversion. Executing the above step therefore guarantees that no memory deadlock will occur when the intermediate data is prepared.

Figure 28:
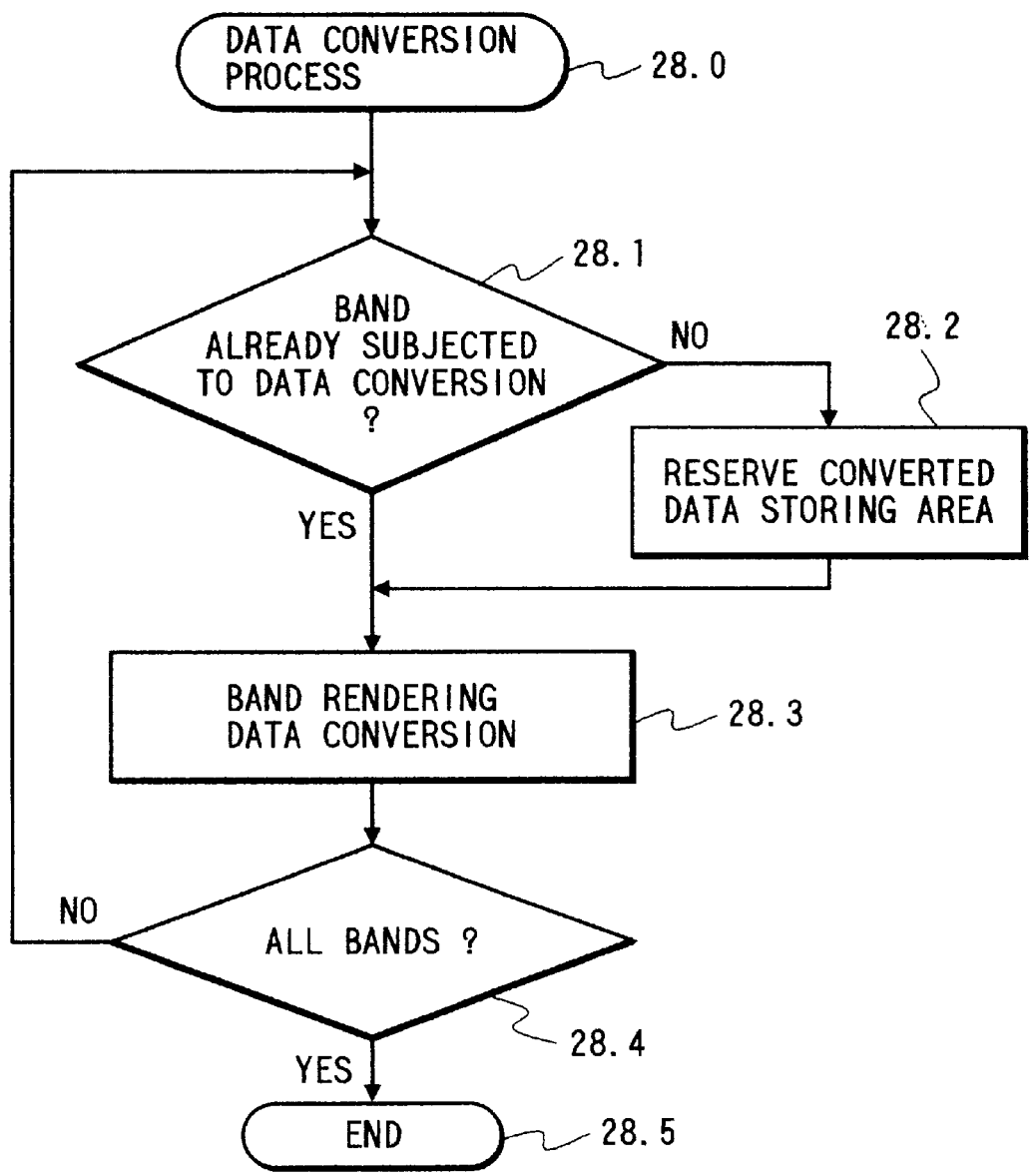
FIG. 28 is a flowchart of a data conversion process in the second embodiment of the invention.

The data conversion process is described with reference to FIG. 28.

Subsequently, at step 26.4 the intermediate data being processed is actually stored in the RAM 25.5.

(Calculation for Pre-Rendering—Same as in First Embodiment)

Subsequently, at step 26.5 calculation for avoiding the print overrun is executed. The calculation is the same as in the first embodiment described with reference to FIG. 15.

Subsequently, it is determined at step 26.6 whether or not the printing data of one page has been processed. If one page is not completed, the next printing data is processed by repeating from the step 26.1.

(Processing after Degradation)

After the printing data of one page has been processed, it is determined at step 26.7 whether or not the page has been subject even once to the data conversion process of step 26.3. If so, the process goes to step 26.11 for converting all the printing data.

At step 26.11, the intermediate data prepared after the last data conversion process of step 26.3 is rendered and converted. The process is the same as the data conversion process executed at step 26.3, and is described later with reference to FIG. 28.

Eventually, the printing data is stored in the RAM 25.5 in the format of converted data for all the bands. The process goes to the printing output process of step 26.14.

(Pre-rendering Process)

On the other hand, if it is determined at step 26.7 that the data conversion process has not been executed even once, the print-overrun countermeasure is executed at step 26.8. In the same manner as the first embodiment, the bands undergoing print overrun are identified and allocated to respective temporary band rasters.

If the capacity of the RAM 25.5 does not become deficient at step 26.8, at step 26.14 the bands undergoing print overrun are rendered for all the bands and thereafter actually printed/outputted on a sheet of paper. The printing output process is described later with reference to FIG. 29.

If the capacity of the RAM 25.5 is deficient, at step 26.10 the data conversion process is executed on all the bands including the bands not undergoing print overrun in the same manner as at step 26.3 or 26.11. The process is described with reference to FIG. 28.

After the printing data of one page is stored in the RAM 25.5 in the format of intermediate data or output images having been subject to data conversion with a guarantee that no print overrun occurs, then printing output is actually performed onto a sheet of paper at step 26.14. The process is described later with reference to FIG. 29.

27. Description of FIGS. 27A, 27B and 27C (Degrading Shift Determination)

Figure 27:
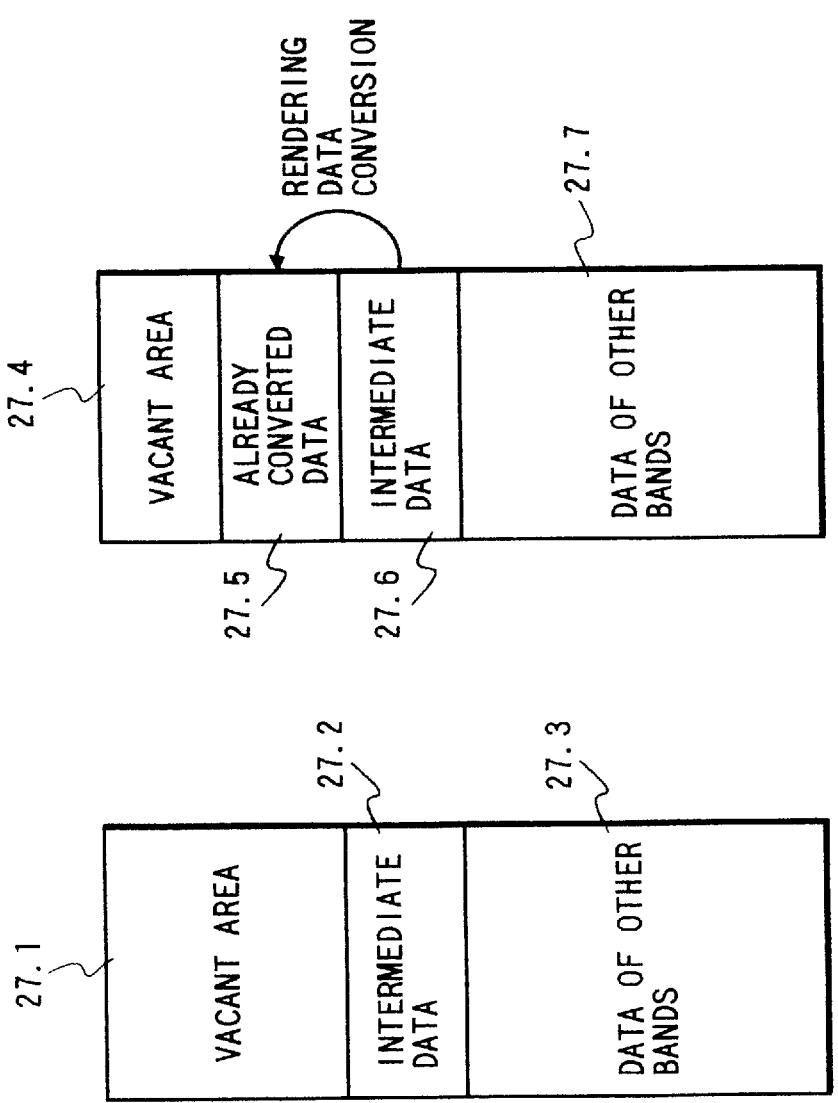
FIGS. 27A, 27B and 27C are explanatory views of a memory deficiency determination method in the second embodiment of the invention.

FIGS. 27A to 27C are diagrams for describing a manner of determining at step 26.2 of FIG. 26 whether or not a memory vacant area required for the data conversion process is deficient. These figures show a process for one band when the data conversion process is executed.

FIG. 27A schematically shows areas in the RAM 25.5 at the time of data conversion process.

Numeral 27.1 is a vacant area of the RAM 25.5, 27.2 is the intermediate data of the band to be processed and 27.3 is the printing data related to other bands.

When the data conversion process is first executed, as shown in FIG. 27B, a converted data area 27.5 is secured in the vacant area, and the intermediate data 27.2 is subject to rendering and data conversion, followed by storing the converted data again.

In the embodiment, because the data conversion process is executed as resolution conversion/gradation conversion, the size of the converted data area 27.5 can be obtained without actually executing the data conversion process.

For example, when through the resolution conversion process the resolution is changed from 600 DPI to 300 DPI, through the conversion process the size is reduced to ¼. In the same manner when through the gradation conversion process the gradation is changed from 8 bits to one bit, through the conversion process the data is reduced in size to ⅛. If both conversion processes are executed, the data size after the conversion is 1/32.

It is needless to say that while in the embodiment the data conversion process is executed as resolution conversion/gradation conversion, by way of example, the data conversion is not limited to the two types, but may be executed by any other similar conversion process.

If the data conversion process is already executed, a new area needs not to be secured because the converted data area 27.5 exists. By using the area, the rendering and the data conversion are executed.

Thereafter, since the intermediate data 27.6 is no longer necessary, the data is deleted to create a vacant area 27.10 as shown in FIG. 27C. If necessary, by moving a converted data 27.9, vacant areas 27.8 and 27.10 can be a continuous area.

In the data conversion process, a sequence of the aforementioned steps are executed for all the bands. If the data conversion process is executed even once, the converted data area already exists in the second and subsequent data conversion processes, and therefore the vacant area will never be deficient during the data conversion process.

On the other hand, for the first data conversion process, whether or not the memory size required for the data conversion process is deficient can be determined by examining the size of a vacant area 27.4 for each band.

Assuming for some band k that the size of the vacant area 27.4 is Sk, the size of the converted data 27.5 is B, the size of the intermediate data 27.2 is Pk and the size of the intermediate data to be stored in the RAM 25.5 is PC, then the relationship between the size S(k−1) of the vacant area 27.1 before the data conversion process and the size Sk of the vacant area 27.8 after the process is expressed below from FIGS. 27A to 27C:

$$Sk=S(k-1)+Pk-B-PC$$

Also, assuming that a total memory size available for the process is M and the number of bands is n, a size SO of a vacant area before the processing of all the bands is expressed by:

$$SO=M-(P1+\ldots+Pn)-B$$

However, where the intermediate data to be stored in the RAM 25.5 is of the first band, the vacant area size SO is as follows:

$$SO=M-(P1+\ldots Pn)-B-PC$$

Here, because M, B, PC and Pk are known for all the bands, Sk can be calculated for all the bands. A minimum value MIN(Sk) represents a minimum value of the memory vacant capacity in the data conversion process.

When MIN(Sk) is less than zero, it can be determined that the data conversion process is unfeasible if the intermediate data to be stored is stored.

As aforementioned, after determining at step 26.2 of FIG. 26 whether or not the data conversion process becomes unfeasible because of memory deficiency if the intermediate data is stored, then the intermediate data is stored at step 26.4 when the memory is determined not to be deficient, and is stored after the data conversion process of 26.3 when the memory is determined to be deficient. Therefore, all the data conversion processes can be always succeeded and the printing data can be received without causing memory deadlock.

28. Description of FIG. 28 (Data Conversion Process)

The data conversion processes executed when the memory is determined to be deficient is now described with reference to FIG. 28.

First, it is determined at step 28.1 whether or not the band to be processed is already subject to data conversion. If the data conversion is not executed, at step 28.2 a converted data storing area of the known size is reserved. Because it is assured that the area can be reserved from the aforementioned step of determining whether or not the memory deficiency occurs, the memory deadlock phenomenon never occurs.

Thereafter, at step 28.3 the intermediate data is rendered and the data conversion process is performed by the resolution/gradation converting unit 25.8. Thus, the printing data of the band is managed as the converted data.

Finally, the process is looped back to step 28.1 until it is determined at step 28.4 that a sequence of data process steps are executed for all the bands.

Through the process, all the printing data can be printed without causing memory deadlock.

29. Description of FIG. 29 (Printing Output Process)

Figure 29:
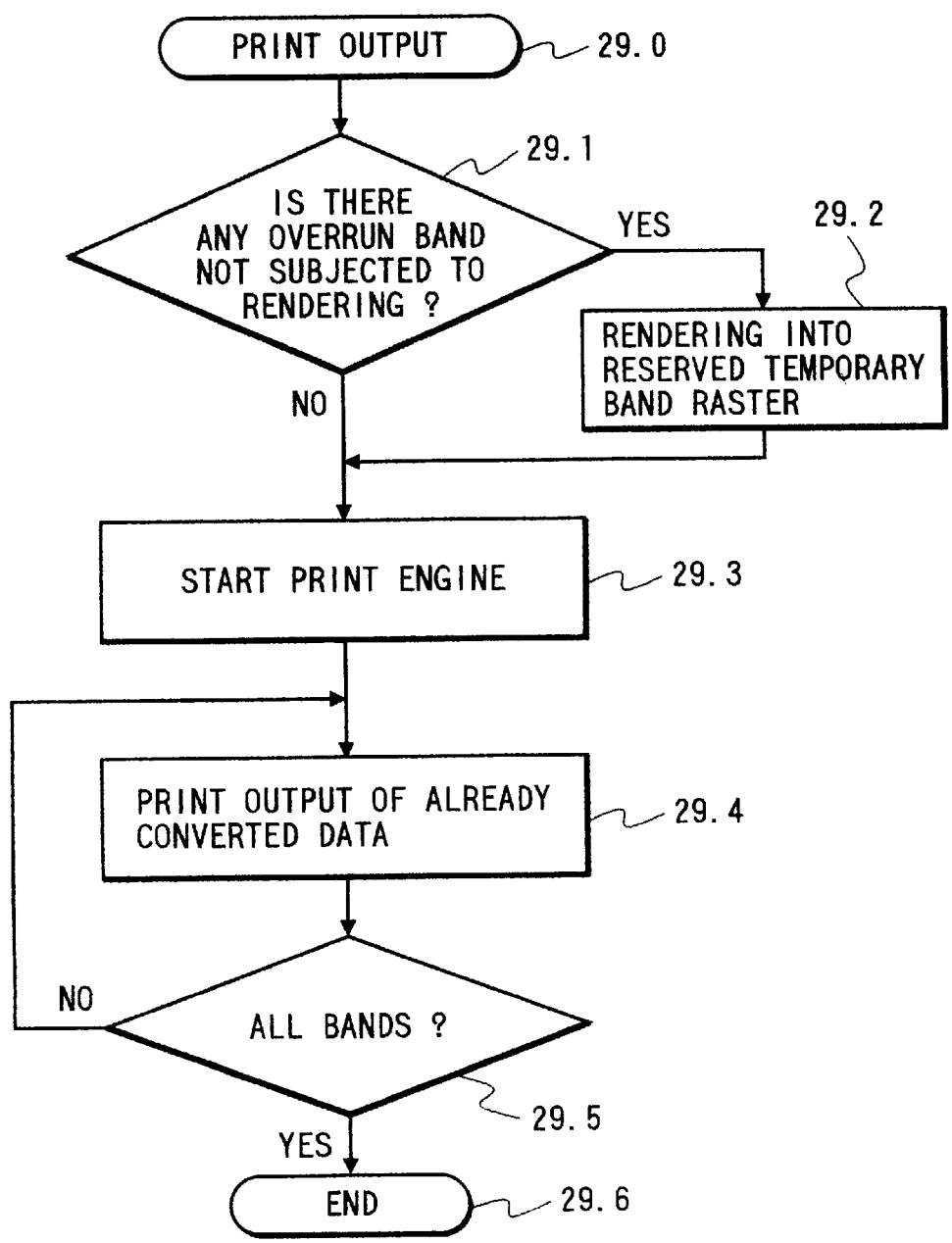
FIG. 29 is a flowchart of a printing output process in the second embodiment of the invention.

Finally, the printing output process executed at step 26.14 of FIG. 26 is detailed with reference to FIG. 29.

First, at steps 29.1 and 29.2 the rendering for the overrun countermeasure is executed into the temporary band raster in the same manner as the first embodiment.

Subsequently, at step 29.3 the printing engine is actually started.

After the start of the shipping, at step 29.4 the converted printing image data is outputted for printing to the engine as it is, and the process is repeated from the step 29.4 until it is determined at step 29.5 that all the bands are printed/outputted.

As aforementioned, in the second embodiment of the invention, while suppressing the capacity required for the memory to some degree without causing print overrun and memory deadlock, a guarantee that all the pages can be surely printed can be advantageously realized inexpensively.

Also, as generally known, the resolution conversion process and the gradation conversion process are simpler than the compression process, have a higher processing speed, and require no special hardware.

Therefore, by giving a feature that the data conversion of the image is executed by the resolution/gradation conversion process and a guarantee that the converted data of one page can be surely stored in the memory after the process, the invention has a specific advantage that the processing speed is higher than when using the compression process and the cost is reduced because of no need of special hardware although image quality is deteriorated.

As is apparent from the above description, the printing apparatus and the memory management method according to the invention can provide advantages as follows. The printing process, in which the time required for rendering is calculated, is provided with a memory management step of managing the printing data in units of band, a step of calculating a size of the printing data in a memory, a memory management step of managing plural band rasters, a memory management step of varying the number of band rasters to be managed in the memory, a memory management step of converting an image into data for management, a step of determining whether or not data conversion is to be performed in accordance with a memory state, and a step of calculating a size of the data in the memory after the data conversion. Therefore, while suppressing the capacity of the memory to some degree without causing print overrun and memory deadlock, a guarantee that all the pages can be surely printed can be realized inexpensively.

Also, in the printing apparatus and the memory management method of the invention, since the data conversion of the image is executed by the compression process, the printing with a high resolution can be achieved with a small memory capacity.

Further, in the printing apparatus and the memory management method of the invention, since the data conversion of the image is executed by the resolution lowering process or the gradation lowering process, the printing process can be performed at a high speed.

What is claimed is:

1. A printer for printing data from a host computer, said printer comprising:
   first determining means for determining whether one page of print data has been stored in a memory, the print data being provided band by band;
   rendering means for rendering one band of the print data into a raster image and storing the raster image in a band raster area reserved in the memory;
   second determining means for determining whether a number of band raster areas is to be increased in the memory;
   conversion means for changing the form of the raster image stored in the band raster area; and
   third determining means for determining, if said first determining means determines that one page of print data has been stored and said second determining means determines that the number of band raster areas is to be increased, whether said conversion means is to be actuated.

2. A printer according to claim 1, wherein said conversion means changes the form of the raster image by at least one of compressing the raster image, lowering the resolution of the raster image, and lowering the gradation of the raster image.

3. A printer according to claim 1, wherein said rendering means changes a rendering timing in response to an increase in the number of band raster areas.

4. A printer according to claim 1, wherein said third determining means determines band by band whether said conversion means is to be actuated.

5. A printer according to claim 1, further comprising means for estimating the size of the raster image as form-changed by said conversion means.

6. A print controller for controlling a printing device to print data from a host computer, said print controller comprising:
   first determining means for determining whether one page of print data has been stored in a memory, the print data being provided band by band;
   rendering means for rendering one band of the print data into a raster image and storing the raster image in a band raster area reserved in the memory;
   second determining means for determining whether a number of band raster areas is to be increased in the memory;
   conversion means for changing the form of the raster image stored in the band raster area; and
   third determining means for determining, if said first determining means determines that one page of print data has been stored and said second determining means determines that the number of band raster areas is to be increased, whether said conversion means is to be actuated.

7. A print controller according to claim 6, wherein said conversion means changes the form of the raster image by at least one of compressing the raster image, lowering the resolution of the raster image, and lowering the gradation of the raster image.

8. A print controller according to claim 6, wherein said rendering means changes a rendering timing in response to the number of band raster areas being increased.

9. A print controller according to claim 6, wherein said third determining means determines band by band whether said conversion means is to be actuated.

10. A print controller according to claim 6, further comprising means for estimating the size of the raster image as form-changed by said conversion means.

11. A computer readable medium having program code for instructing a computer to perform a printing method comprising:
    a first determining step for determining whether one page of print data has been stored in a memory, the print data being provided band by band;
    a rendering step for rendering one band of the print data into a raster image;
    a storing step for storing the raster image in a band raster area reserved in the memory;
    a second determining step for determining whether the number of band raster areas is to be increased in the memory;
    a conversion step for changing the form of the raster image stored in the band raster area; and
    a third determining step for determining, if it is (i) determined in said first determining step that one page of print data has been stored, and (ii) determined in said second determining step that the number of band raster areas is to be increased, whether said conversion step is to be performed.

12. A computer readable medium according to claim 11, wherein the raster image is changed in form in said conversion step by at least one of compressing the raster image, lowering the resolution of the raster image, and lowering the gradation of the raster image.

13. A computer readable medium according to claim 11, having additional program code for performing a changing step for changing a rendering timing in response to the number of band raster areas being increased.

14. A computer readable medium according to claim 11, wherein it is determined band by band, in said third determining step, whether said conversion step is to be performed.

15. A computer readable medium according to claim 11, having additional program code for performing an estimating step for estimating the size of the raster image as form-changed in said conversion step.

16. A method for printing data, said method comprising:
   a first determining step for determining whether one page of print data has been stored in a memory, the print data being provided band by band;
   a rendering step for rendering one band of the print data into a raster image;
   a storing step for storing the raster image in a band raster area reserved in the memory;
   a second determining step for determining whether the number of band raster areas is to be increased in the memory;
   a conversion step for changing the form of the raster image stored in the band raster area; and
   a third determining step for determining, if it is (i) determined in said first determining step that one page of print data has been stored, and (ii) determined in said second determining step that the number of band raster areas is to be increased, whether said conversion step is to be performed.

17. A method according to claim 16, wherein the raster image is changed in form in said conversion step by at least one of compressing the raster image, lowering the resolution of the raster image, and lowering the gradation of the raster image.

18. A method according to claim 16, further comprising a changing step for changing a rendering timing in response to the number of band raster areas being increased.

19. A method according to claim 16, wherein it is determined band by band, in said third determining step, whether said conversion step is to be performed.

20. A method according to claim 16, further comprising an estimating step for estimating the size of the raster image as form-changed in said converting step.

* * * * *

UNITED STATES PATENT AND TRADEMARK OFFICE
CERTIFICATE OF CORRECTION

PATENT NO. : 6,052,200
DATED : April 18, 2000
INVENTOR(S) : Keisuke Mitani

It is certified that error appears in the above-identified patent and that said Letters Patent is hereby corrected as shown below:

Column 1,
Lines 14 and 26, "apparatus" should read -- apparatuses --.

Column 3,
Line 20, "embodiment" should read -- first embodiment --.

Column 4,
Line 6, "apparatus" should read -- apparatuses --.

Column 5,
Line 12, "processing" should read -- processing, --.

Column 6,
Line 61, "time" should read -- the time --; and
Line 67, "the structure below" should read -- a structure as described below --.

Column 7,
Line 43, "s tore" should read -- store --; and
Line 49, "th e" should read -- the --.

Column 8,
Line 27, "a nd" should read -- and --.

UNITED STATES PATENT AND TRADEMARK OFFICE
CERTIFICATE OF CORRECTION

PATENT NO. : 6,052,200
DATED : April 18, 2000
INVENTOR(S) : Keisuke Mitani

It is certified that error appears in the above-identified patent and that said Letters Patent is hereby corrected as shown below:

Column 12,
Line 32, "15.4" should read -- 15.4, --; and
Line 39, "bands." should read -- band. --.

Column 13,
Line 36, "e.g.,:" should read -- e.g.: --.

Column 16,
Line 65, "method causes" should read -- methods cause --.

Column 22,
Line 49, "are" should read -- is --.

Signed and Sealed this

Twenty-seventh Day of November, 2001

Attest:

NICHOLAS P. GODICI
Attesting Officer    *Acting Director of the United States Patent and Trademark Office*